(12) United States Patent
Vera

(10) Patent No.: US 9,420,802 B1
(45) Date of Patent: Aug. 23, 2016

(54) TAMALE MASA SPREADER

(71) Applicant: Daniel Vera, Corpus Christi, TX (US)

(72) Inventor: Daniel Vera, Corpus Christi, TX (US)

( * ) Notice: Subject to any disclaimer, the term of this patent is extended or adjusted under 35 U.S.C. 154(b) by 137 days.

(21) Appl. No.: 13/999,991

(22) Filed: Apr. 14, 2014

(51) Int. Cl.
*A22C 7/00* (2006.01)
*A21C 14/00* (2006.01)
*A21C 11/00* (2006.01)

(52) U.S. Cl.
CPC ................. *A21C 14/00* (2013.01); *A21C 11/00* (2013.01); *A21C 11/006* (2013.01)

(58) Field of Classification Search
CPC ........ A21B 5/00; A21C 11/00; A21C 11/006; A21C 11/163
USPC .................................. 99/349, 432; 425/412
See application file for complete search history.

(56) References Cited

U.S. PATENT DOCUMENTS

| | | | |
|---|---|---|---|
| 1,527,870 A | 2/1925 | Hausman | |
| 2,134,862 A * | 11/1938 | Dunnam | B65B 9/12 452/47 |
| 2,348,082 A | 5/1944 | Lofgren | |
| 3,736,088 A * | 5/1973 | Jimenez | A21B 3/00 118/506 |
| 4,084,493 A * | 4/1978 | Quintana | A21C 9/063 426/297 |
| 5,211,107 A * | 5/1993 | Tsay | A21C 11/163 425/132 |
| 5,281,427 A * | 1/1994 | Rahim | A21B 5/00 425/376.1 |
| 5,437,076 A | 8/1995 | Vasquez | |
| 5,667,821 A * | 9/1997 | Castaneda | A21C 11/00 425/218 |
| 6,170,391 B1 * | 1/2001 | Pomara, Jr. | A21C 9/063 99/450.1 |
| 6,443,054 B1 * | 9/2002 | McCarney | A21C 11/006 425/150 |
| 7,487,718 B2 * | 2/2009 | Foulon, Jr. | A21C 9/063 426/502 |
| 7,850,440 B2 * | 12/2010 | Alvidrez | A21C 11/008 269/302.1 |
| 8,356,696 B1 | 1/2013 | Carroll et al. | |
| 8,506,283 B1 * | 8/2013 | Gonzales | B30B 11/02 249/122 |
| 8,561,854 B2 | 10/2013 | Tirone | |
| 9,149,046 B2 * | 10/2015 | McCarney | A21C 11/006 |
| 2004/0035301 A1 * | 2/2004 | Huang | A21C 9/061 99/450.7 |

OTHER PUBLICATIONS

Beginning Claim Drafting, Independent Inventors Conference, Aug. 15, 2014.*
Advanced Claim Drafting, Independent Inventors Conference, Aug. 15, 2014.*

* cited by examiner

*Primary Examiner* — Nina Bhat

(57) ABSTRACT

The present invention; in its primary intention, is a system wherein a refillable tamale masa container has motivating means for moving masa through the container and out to the underside of a masa spreading trowel that is in communication with the masa in the container, thus effecting a more sanitary and motion reducing spreading of tamale masa dough onto a corn husk. The husk with the masa spread on it is called a tamale blank. The system has several embodiments that vary in how the system decreases human contact and motions and efforts necessary to make many tamale blanks. The system can be used to spread other viscous materials on various surfaces.

20 Claims, 16 Drawing Sheets

60

62

61

63

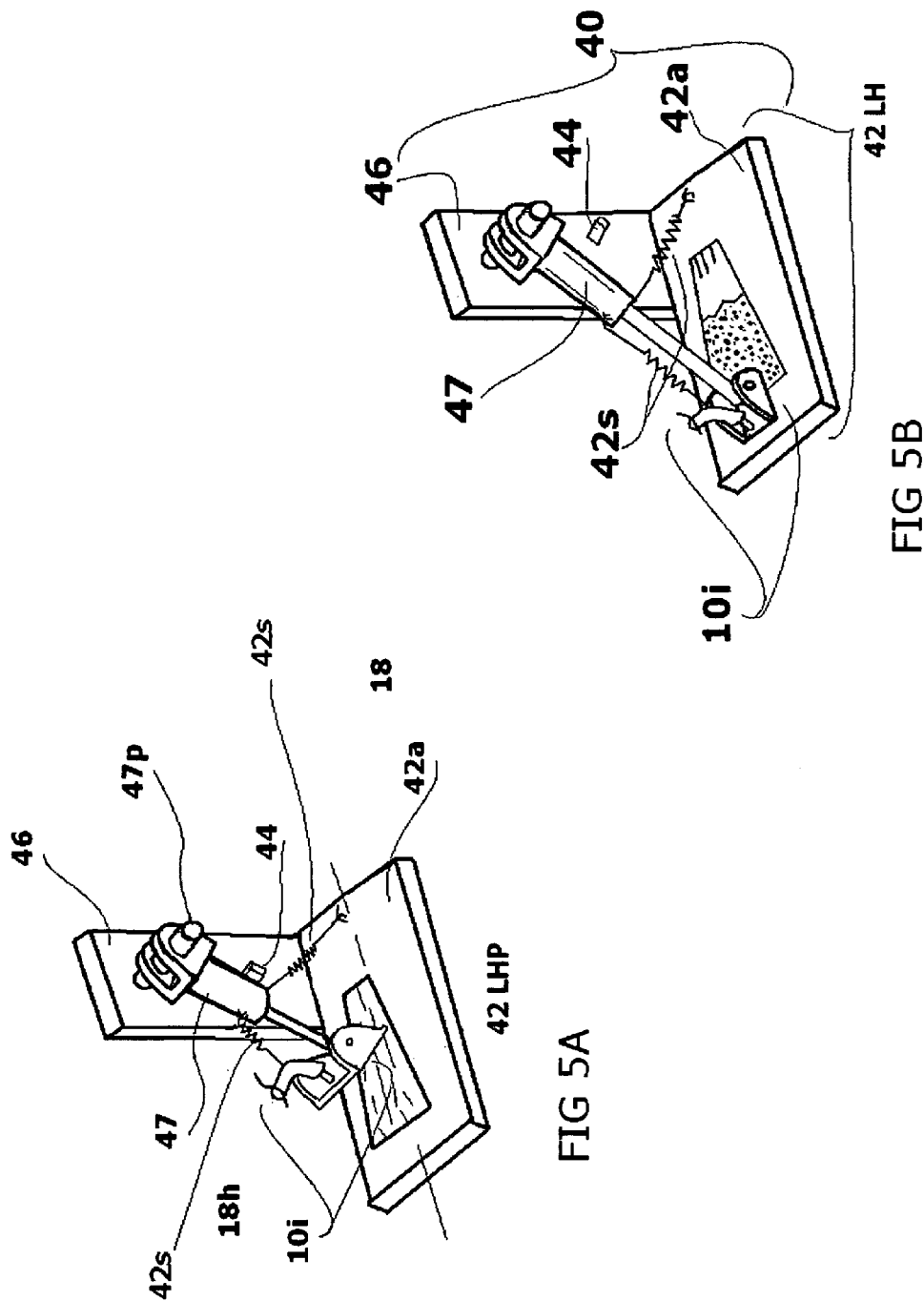

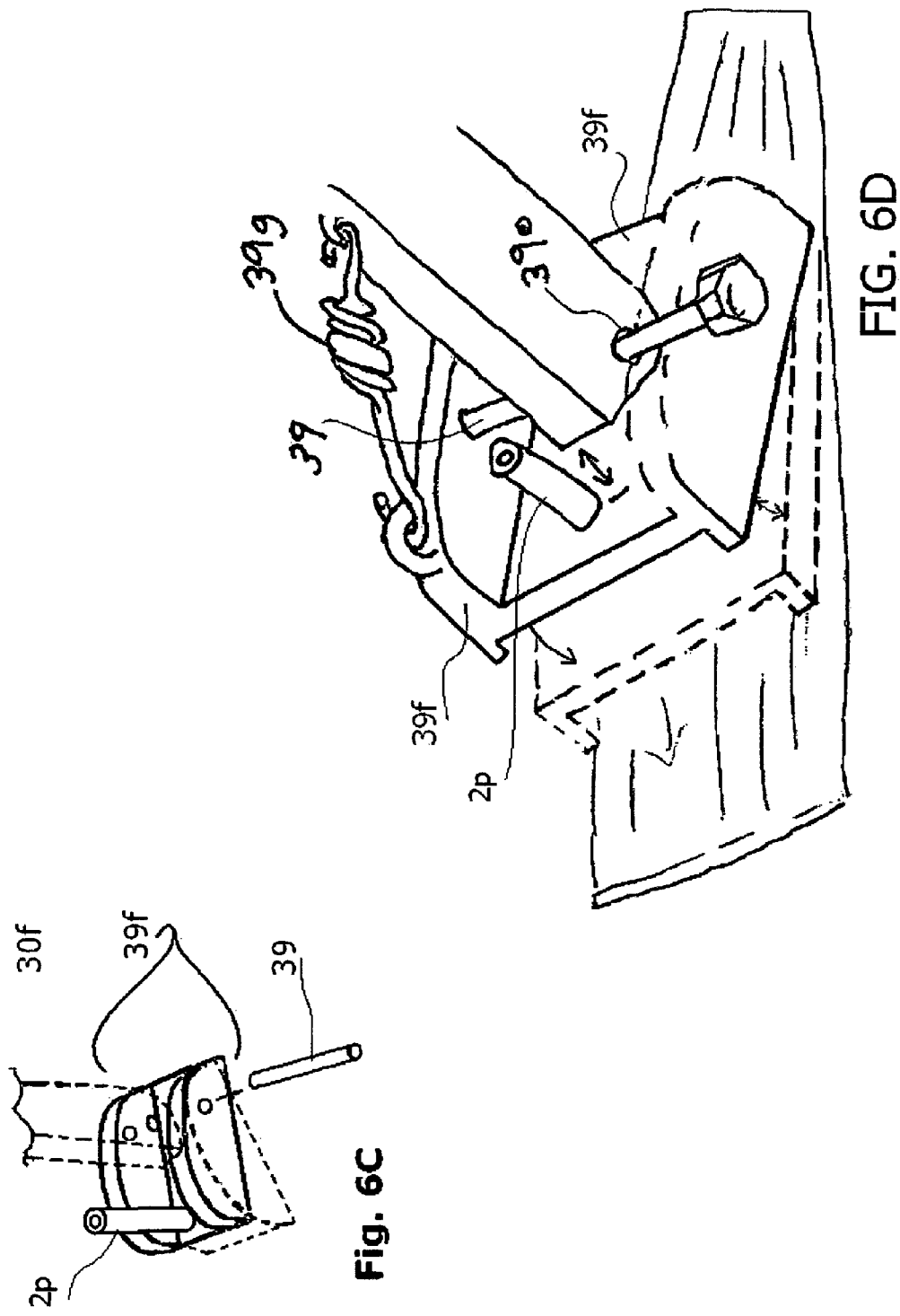

TAMALE MASA SPREADER

SUMMARY OF THE INVENTION

A system for enabling and/or facilitating the automatic depositing and pressure smearing or spreading or buttering of thick viscous fluids such as; grease, clay in a plastic state, molten plastic, or tamale masa hereafter: masa, onto a leaf. In one basic embodiment a refillable cylindrical container of masa is in conduit communication with a rectangular flat presser foot, like a trowel, of about 5 in. square or about 12 cm square, having at least one hole in it for masa to pass through from the presser foot's top side to its underside. With the application of motive force or pressure, by any one of a variety of means, the masa is moved from the cylinder into and through the conduit and out of the presser foot by pressure means applied to the masa at the container. The presser foot has at least one hole in it for delivering masa to and through the presser foot so that the presser foot can have the masa between the presser foot and a substantially flat surface; such as but not limited to a corn husk supported by a table or plank. Then and thereafter, the masa is now pressed and flattened by the presser foot and smeared by the relative lateral movement of the presser foot to the flat surface or a corn husk or plate or cloth or sheet; hereafter sometimes: leaf. The system provides that the masa be delivered and/or pressed with enough force during lateral movement to effect adherence of the masa to the leaf so that the masa will not fall off the leaf during further handling of the now masa buttered leaf.

BACKGROUND OF THE INVENTION

The present invention relates to spreading tamale masa onto a corn husk or other substantially flat leaf like surface. In regards to tamales it is important to consider that traditionally tamales are an interactive food. That is, the consumer traditionally desires to unwrap her cooked tamale just before eating it. This lends the assurance of freshness and non-contamination virginity of the tamale with other foods or spices or contaminants. It also presents well as an aesthetically pleasing food wearing a dress. In this regard, it is also important that the tamale remain intact and wrapped in its own individual husk until after it is cooked and served. There are different styles of tamales. For example a Veracruzano tamale is a pigs foot wrapped in banana leaf that has been spread with tamale masa. Some tamales are named for regions of Mexico. It is believed that the instant design of tamale is known as a Norteno or "Northern" style of tamale referring to the northern area of Mexico. It is a further traditional aspect, of a Norteno tamale, hereafter: tamale, that the wrapping process creates a flap of pure masa that results when the tamale blank is rolled over itself. This flap helps to hold the tamale sealed; and also stuck to the husk during the cooking and subsequent handling of the tamale. Tamales can be considered a finger food and can be and have been eaten while being held with the fingers. When the tamale is unwrapped the resulting flap can easily be broken away from the main semi-cylindrical body of the tamale and used by the consumer to, sample the flavor and temperature of the tamale masa prior to biting into the filled portion of the tamale, or the flap can be used to mix with other foods on the plate as an enjoyable tasting experiment. Corn husks have a narrow end and a broad end with the broad end being slightly but notably thicker than the narrow end. It is peculiar in regards to corn husks adhesiveness that corn husks have an outside rough surface and an inner side, silky or smooth surface.

The "outside" meaning that when an ear of corn is intact it is covered by several layers of leaves which grow wrapped around or partially around the corn ear. We call these leaves: corn husks, or sometimes, leaves, and these leaves have two surface sides; one surface that faces towards the corn is the inside which tends to be smooth; and, the side facing away from the corn is the outside which tends to be rough. Some of the inner husks those closest to the ear of corn can be smooth on both sides. Occasionally some of these inner husks can be used and smeared on either side. Most of the useable leaves, however, do have a substantially rougher outside and a smoother inside. Generally the husks have significant variance in size. Corn husks are all generally roughly trapezoid shaped when layed flat, having a narrow or tail end and a broad end and can vary in width on the broad end from about 3 inches to about 12 inches. The tail ends can come to a point but are sometimes trimmed near the tail end transversely to thus create a trapezoid shape and a narrow end that is from about ½" to about 2 inches wide. They vary in length from about 5 to about 14 inches in length measuring from the narrow end to the broad end.

If the masa is, erroneously, applied to the outside of the husk the adherence can be so strong, once cooked, that it can be nearly impossible to remove the tamale from the husk. Thus it is counter-intuitively, important, to apply the masa to the side that is more difficult for the masa to adhere to, when it is also a goal for the masa to adhere to the husk! That: limited adherence, is why it is important that the masa be firmly pressed onto the husk. For purposes of further description tamale husks have an imaginary longitudinal centerline extending from the center of the tail end to the center of the broad end of the leaf.

Typically the corn husk is only partially spread with masa. The masa is typically spread on from about ½ to about ⅞ths of the leaf's surface completing on the broad end, leaving the narrow end, sometimes called the tail, without any masa at all.

The result is a partially coated tamale husk referred to as a tamale blank.

Tamale blanks are typically further handled by being filled with mincemeat, ground or shredded beef, or ground or shredded chicken, or ground or shredded pork, or ground or shredded venison, or combinations of those meats. Beans or other fillings such as cheese, rice, corn, or other legumes and/or vegetables are also used as tamale fillings. The inventor has even used left over pizza sliced into finger sized billets as a tamale blank filler. Typically however, a dollop of a generally gooey filling is longitudinally arranged on top of the masa on the tamale blank such that its corpus is roughly wiener shaped and biased to one side or the other of an imaginary longitudinal centerline running from the center of the broad end of the leaf to the center of the narrow end. The filling is usually cooked prior to being utilized as a filling. The filling is usually left just short of the both tail end and broad end limits of the masa so that it can be sealed into the masa to be completely enveloped thereby, once cooked. The now filled tamale blank is then rolled transversely to enclose the filling 100% of its 360 degree circumference and then further overwrapped by the remainder of the leaf by from about a 5% to about 50% amount of the 100% wrap. The unspread narrow end now forms a tail which is folded under the rolled tamale thus sealing what is known as the bottom end of the tamale. The opposite end would be known as the top or open end. The top end is momentarily pinched to seal the masa around the filling at the top end but no further treatment of the top end is required after that. The tamales are stacked for temporary storage or arranged either horizontally or with tail end down to avoid spillage of the filling during the cooking process.

Cooking is typically a steaming process. "Down" refers to the floor one is standing on so that a partially filled pot of water has water standing on the downward part of the pot. Thus substantial handling can be required of the tamale blank after it has been produced.

PRIOR ART PART 1

U.S. Pat. No. 5,437,076 issued to Vasquez; hereafter: Vasquez; describes a trowel like masa spreading device, and substantially sets forth the history and problem of spreading masa onto a corn husk; hereafter sometimes: leaf.

A comprehensive listing of all the possible fields to which this invention may be applied is limited to the imagination of persons familiar with the art of applying viscous fluids to a surface, whether flat or contoured. Such a complete listing is prohibitive because of the potential long length of such list and the practicable reasonable length of a patent application; however several fields are suggested to help define the breadth and scope of the patent that may issue. It is asserted, that the term: masa when used herein includes, but is not limited to: lubricating grease, peanut butter, butter, noxious chemicals such as resin that is used in fiberglass work and as more comprehensively set out later in the Detailed Description of Exemplary Embodiments It is asserted that the present system invention would cover the pressure application of any of the listed high viscous, adhesive items singularly or in combination with others in the masa list or which may be obvious in use; onto a leaf: which leaf would be any one of a: corn husk, woven or amorphous fiber cloth or paper sheet, or again, as further set out in the detailed description.

It is further background that tamales are conveniently unitized; and made to be eaten one at a time; they are, when cooked, semi-cylindrical. In typical Norteno style size, they can range in size from about 3 to about 6 in. or from about 7 cm to about 15 cm long; and from about ½ in. or 1.5 cm to about 3 in. or 8 cm in diameter. Most typically Norteno tamales are about 1 in. in diameter and about 6 in. long. They have for many years been made to be served and eaten in multiples of 1. For many years they have been made to be sold, by indigenous Mexican people as an income supplement and typically sold by the dozen. As such there is occasion for the manufacture of many tamales at a time in order to take advantage of the utilization of the masa, in batch quantity, and the other tamale ingredients in a production run that is sanitary and efficient. Freshly prepared masa has a safe room temperature working time of about 2 hours. Thus it is important to use the masa quickly for reasons of economy. Masa can be refrigerated for later use however.

What the Vasquez prior art does not address, that the instant invention does address, is the ergonomic and sanitary effect of using the invention that Vasquez discloses relative to the production of tamale blanks.

Vasquez refers to "scooping" masa and "gently pressing down" and "moved" in its description of use of the device at: column 4, line about 32-43. It is not clarified, but yet implied, that it is a human that is manipulating the device. Hereafter the quantity of masa "scooped" for such "single stroke" application of masa to a leaf may be referred to as a dollop. Masa is typically made in batches ranging from about one pint to about 5 gallons, but may be much larger. Typically further, sometimes, a large glob or amorphous batch of masa is placed on a table or flat working surface. This technique can be observed being exhibited by several persons on the internet, on sites such as You Tube. On the site one uses the internal search engine to search for "making tamales."

The instant inventor has been using a 4 in. putty knife, to prepare tamale blanks, for many years by such "batch of masa placed on a table" method. Vasquez contradicts itself at column 1 line about 55-65 where it says " . . . allows the entire operation to be accomplished with one stroke." This is said in reference to the spreading of the masa on a corn husk. Moreover it is asserted as the principle object of the invention " . . . where masa can be spread on a corn husk with a single stroke." However, that is not possible if first one must "scoop", then "pressed down," then "move." Yet still, "one stroke" is what Vasquez asserts. There are at least three motions described: scooping, pressing and moving. This contradicts that the "entire operation" is "accomplished with one stroke." As such while Vasquez does facilitate the making of a tamale blank or even several. Once many dozens are desired to be made the Vasquez invention has all of the obvious limitations that come with human labor and the repetitive motions such as that required by the actions of: reaching to "scoop" masa onto the trowel and then "pressing down" and then "moving" the device while holding it at an angle. The back, arms, elbows and wrist and neck are all involved in performing such actions.

Also, humans have proved notoriously unreliable, in personal hygiene; and subject to repetitive motion disease. It is important to reduce the human handling of tamale masa with hand held tools; and, the exposure of tamale masa to the open atmosphere such as would occur in a scooping process as taught by Vasquez. In the typical technique as implied by Vasquez: wherein a corpus of masa, from which it would be "scooped," would be open to a potentially sneezing human, or other atmospheric contaminants, no address to sanitation in regards to the loading of the spreader with masa is mentioned.

Also, the masa, in the interests of the broader scope of this invention may be: a noxious chemical, or have noxious spices, that would not be suitable for human handling. Also, such as might be encountered in the buttering of a viscous fluid chemical in an oxygen depleted atmosphere onto a sensitive or dangerous substrate or surface, and/or at temperatures uncomfortable to humans.

The present invention is different from Vasquez to address the issues of sanitation and automation so as to reduce or eliminate the human involvement and atmospheric exposure of the masa in the spreading of tamale masa onto a leaf.

In the present invention masa is contained in a sanitary, sealed, pressurize-able refillable masa container such as a cylinder having a resealable aperture or cap for reloading with masa, and this masa is pressed through a conduit that is in communication with a trowel like presser foot that has a top side and bottom side and a hole or orifice through which masa can pass to the underside of the presser foot. Whereafter the presser foot is manipulated to press the masa down and then while continuing downward pressure stroking the presser foot laterally, pressing, spreading and adhering the masa along a corn husk. It provides a tool adaptable to automation.

PRIOR ART PART 2

The present invention also combines with the above described pressure foot; and, a pressurize-able container such as disclosed in U.S. Pat. No. 5,067,591 A a pneumatic grease gun; and U.S. Pat. No. 175,757 A a mechanical lever operated lard press; and, U.S. Pat. No. 1,527,870 a screw drive sausage stuffer; U.S. Pat. No. 8,561,854 B2 a cake decorating tool; and, U.S. Pat. No. 8,356,696 a lubricating system. A tamale machine made by BE&SCO is also relevant but not dispositive of the present invention as is a tamale masa press made by Tamale King and a biscuit press. These inventions might be used to extrude a cylinder shaped stuffed masa segment that can be wrapped in a corn husk but they do not adhere to the husk nor do they have closed ends or pure masa flaps and are thus ineffective for producing traditional tamales and they do not make tamale blanks. It is necessary to press masa firmly onto a corn husk for the masa to adhere to the husk. Otherwise, during handling, and when the tamale is cooked, typically by steaming, they have a tendency to fall apart, that is the masa separating spontaneously from the husk, during removal from cooking pots and during serving and before they can be interactively enjoyed by the ultimate eater of the tamale. The referred to prior art machines can easily be found via internet search engine searches using the generic words or specific words used to describe them. The printed page, of the internet site displaying them, have been included for the file history of this application.

U.S. Pat. No. 2,348,082 refers to a vacuum cleaner issued to Lofgren. This reference in fact works exactly in reverse of the invention presented here. Referring to FIG. 1 of the Lofgren patent, there is a vacuum chamber 10 that pulls in dirty atmosphere via a conduit 11 which is attached to a nozzle 12 that is used to remove dirt from a flat surface. It is the nearly the perfect inverse of the present invention. Viewed schematically but reversed in operation the chamber 10 could represent pressurizing masa means with masa within it and send the masa out through the conduit 11 and the masa could be expelled or extruded out of the nozzle 12 onto a flat surface. Even the chamber is designed to be quickly opened for emptying and cleaning; which in reverse would function identically for cleaning and in addition would be used to load with a batch of masa to be expelled. All that would be missing is a remote switch mounted on the nozzle or foot controlled or digitally programmed controls.

One non-patent prior art device advertised on the internet which web page is printed and supplied for the file history is titled: Autotube Dispensing System for collapsible tubes. This device purports to use a chamber that can be charged or filled with a toothpaste type tube and then via remote actuator or via digital programmable function can discharge the contents of the toothpaste type tube. It can auto cycle and also work in a timed mode which includes a dispense time and a wait and pause condition between cycles. It supplies regulated pressure to its cylindrical chamber and appears to be a self-contained: compressor, regulator, timer, remote actuated or program actuated pressurizer for a chamber that can hold a toothpaste type tube for dispensing the tube contents; Referred to later as a self-contained unit with the understanding that it will be of a size and strength to function with masa.

Thus the prior art shows there are many ways to pressurize masa in a vessel that contains masa in order to motivate the masa to travel: out of the container, and through a limited conduit, and out to be applied. The foregoing masa delivery means being later referred to as a: controlled masa delivery means. In the following examples, it is considered that the vessels described can be opened and cleaned and refilled with bulk masa or recharged with a prepackaged self-contained container of masa.

The following example means for motivating thick viscous fluids are considered functional equivalents for the present invention: a motorized or manual: screw drive sausage gun or sausage stuffer; caulking gun, cake decorating gun or tool. A pneumatically pressurized air tight pot having a discharge orifice would also be such a functional equivalent. This is only a partial list of ways to pressurize a thick viscous fluid through a hollow chamber more are indicated below. Thus a container can be used to motivate its masa like contents out; whether by squeezing out the contents as one has done with squeezing a toothpaste tube or paste medicines or cake decorating cones; or by, driving a masa pushing piston down a symmetrical hollow chamber, like a cylinder or a square tubing; as is done with the above mentioned caulking guns and sausage presses, and viscous material dispensing devices which use screw drives or levers or ratchet and pawl piston-advancing means, to apply pressure to viscous fluids held in a container; or by, using pneumatic pressure to fill a re-closeable substantially air tight chamber that can be opened and closed for filling with bulk masa. Even a syringe design could be used. Thus several means exist for motivating a thick viscous fluid from a container could be combined with this invention to result in a sanitary masa spreading system. It is conceived and asserted for this application that pneumatic and hydraulic double acting and single acting cylinders are functional equivalents when double acting pneumatic cylinders are called for as piston driving or lever or swing arm actuating means.

SUMMARY EMBODIMENT

For example, in a simplest form "in-line" embodiment: a vertically situated cylinder of about ¾ in.-2 in. in diameter, having a masa and pressure inlet near its top; and, a thumb operated plunger piston, and being mostly filled with masa and having, a hole or nipple outlet of from about ½ in. to about 1 in. dia., near or on the cylinder's bottom.

Now then; The present invention rigidly and communicatively connects any such pressure driving masa means with masa in it and a rectangular block presser foot trowel or a funnel foot trowel that is rigid and strong enough to withstand masa moving through it and repeated pressing to flatten a dollop of masa and stroking against a hard surface to smear it adhesively onto a leaf or corn husk. That is it.

In a remote masa container embodiment: The masa communicative connection between the presser foot and the container can be made via a flexible conduit such as pipe or hose that can transmit masa from a remotely located pressure driven masa vessel to and through the pressure foot. However, in fact, the entire masa container vessel and the pressure foot may be made as a substantially singular in-line product so that the pressure foot is formed at the bottom of the refillable masa container.

The masa is viscous has a tendency to adhere to itself and not drip off of a downward facing dollop as it protrudes and extrudes through the hole or holes in the pressure foot forming a hanging dollop. Said another way: Tamale masa has a viscous quality that holds it together so that it does not fall off or drip off or drip away from the underside of the presser foot as a dollop quantity of masa is extruded out to the bottom side of the presser foot, but hangs there adhered to the masa in the conduit and presser foot. Still the extrusion might occur, once a leaf is placed directly under the presser foot, so that it is yet workable even if the masa drops off onto the leaf before it is pressed and spread.

In yet another basic embodiment: a planer presser foot is about 5 in. square or about 12 cm sq. or rectangular and has a top side and an underside side, wherein the underside is loaded or charged with masa through a hole through the plane via a conduit that is in communication with a closed pressurize-able container, such as a self-contained unit or such as a 4 in. diameter hollow cylinder being about 12 in. long; and also having a removable substantially air tight top with compressed air supply fitting; and a remotely controllable supply of compressed air. The cylinder has a wall thickness of at least about 1/64$^{th}$ in. and tapers to a neck or has a reducer fitting on its downward end. The neck substantially comprises from about a ¼ in. pipe to about a 2 in. pipe, about 1 to about 8 inches long. The presser foot having at least one orifice depends from the neck, such that the masa is in transmittable communication from that container with the presser foot; all the way to and through the top side and out onto its underside of the presser foot. So that once, the motivating means is engaged, say by operating a foot or finger operated switch or actuator to signal to send compressed air to force masa out of the cylinder and through the conduit, and masa is communicated to the presser foot underside; the neck while being grasped by the hand, and the presser foot being immediately there below, is then moved in a: two main part motion, being: a first downward thrust and then a second downwardly biased linear lateral motion. This will uniformly and thinly spread and press and thereby adhere the masa onto and along a corn husk to prepare a ready-for-filling tamale husk or: tamale blank. The indicated lateral motion is from about 1 in. to about 12 in. long depending on the leaf size and desired deposit amount of masa.

Thus in other words: The masa is pressure driven from the container via a conduit and through at least one hole in the presser foot to the underside of the presser foot forming a dollop; and then, the presser foot is used to manually or mechanically press the masa dollop firmly onto the husk and then further spread the masa along the length of the husk with a downward biased lateral motion in line with the husk. Then the presser foot can automatically be recharged with masa by again actuating the masa motivating means, via a remote switch or actuator or automatic actuator or timing device, to again send more masa through the hole immediately after the presser foot has been used to pressure spread the masa dollop of the previous charge onto a corn husk. The tamale blank is removed and a new leaf is set down and firmly held in place on a hard flat surface to repeat the action. Other limits and frames and actuator controls and parts and usages will be used to further describe the various embodiments of this invented system in the following detailed description.

Described and sought to be patented are two presser foot designs and 2 Dependent framus to either of the two presser foot designs; they comprise: two articulated mechanisms: (1) a presser foot hinge mounted to a powered cylinder with a hinge attached presser foot having either an in line, or a remote supply of masa; with manual or automatic actuation. (2) a hinged presser foot mounted to a three swivel joint frame wherein a base has a hinged swing arm that imparts motion to a hinged presser arm that has the presser foot hinged to it, and that can be manually actuated, or power cylinder actuated: via manually actuated means or via automatic or timer actuating means. (3) a refillable masa container powered by fluid pressure that is contiguous with a presser foot.

BRIEF DESCRIPTION OF THE DRAWINGS

In addition to the features mentioned above, other aspects of the present invention will be readily apparent form the following description of the drawings and exemplary embodiments.

FIG. 5A a left hand oriented embodiment of a tamale spreading system; called single slide arm frame with presser foot in retraction.

FIG. 5B an embodiment of a tamale spreading system; called single slide arm frame with presser foot in spreading stroke.

FIG. 6C Shows a view of a press arm mounted limited swivel presser foot; having a masa conduit FIG. 6D Shows an enlarged view of a press arm mounted limited presser foot, having skids, and a masa conduit.

Figure 1:
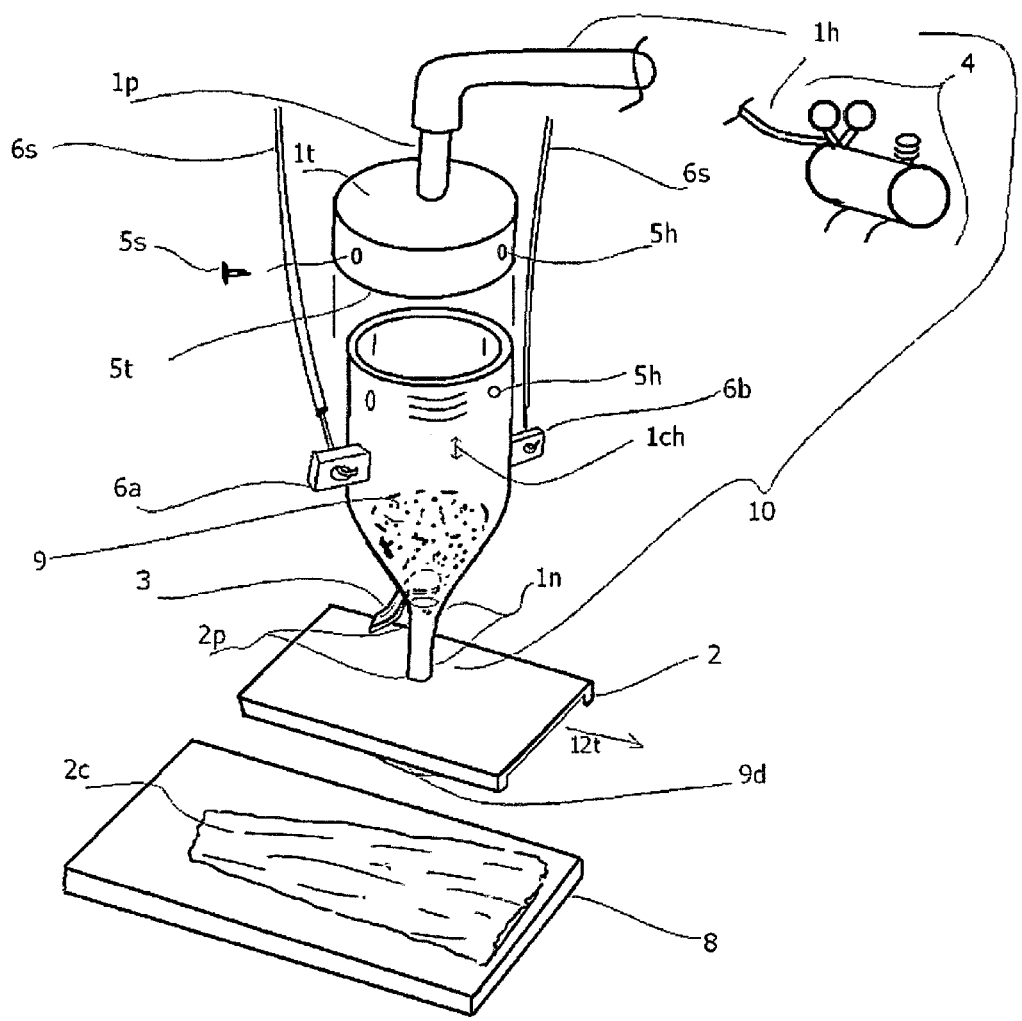
FIG. 1 is an oblique schematic view of one pneumatically driven embodiment of a tamale masa pressure spreading system.

A slide valve, butterfly valve or gate valve is sometimes used to control the flow of masa in on/off fashion.

An actuator comprising a solenoid actuated 5-3 pneumatic valve operated with AC or DC current. So that when actuated the valve causes compressed air to enter into and propel a double acting pneumatic cylinder in either and expanding mode or a contracting mode. When actuated to expand masa is propelled or extruded and via a piston that can move within a masa containing cylinder press masa out of the cylinder and out through a pipe or flexible conduit and out through the presser foot.

DETAILED DESCRIPTION OF EXEMPLARY EMBODIMENTS

Throughout the detailed description lower case letters are used with designating numerals to help group and identify related parts where convenient and possible the letters correspond to the first initial of the name of the part. For example a piston may be designated $4p$ or a spring might be $12s$, a hose $6h$, etc.

The directionally descriptive words are used in relation to an imaginary person standing before a table in a closed room. "up" or "top side" refers toward the ceiling. "Down" or "Downward" refers towards the floor. "To the left" refers to the left hand side of the person. "right" refers to the person's right-hand side. "Near side" refers to something on the table towards being near the person. "Far side" refers to something on the side of the table towards being away from the person.

Engineering terms such as "prismatic joint", "revolute joint", and "cylindrical joint" have been avoided and words such as a "slide surface", a "double acting pneumatic cylinder", and "swivel" "pivot" or "hinge" used in substitution, but the more technical words may be inferred or intended; clarity provided by combination of drawing and descriptive words.

Expanding the Scope of Invention Beyond Tamale Masa:

The invention can be applied to other textiles and uses and limits thus the scope of materials to be spread like the masa would also include: carbon fiber work resin and in other resins for impregnating fibers and cloths. It also includes glue and dough and gels and cheese and fruit preserves. It also includes grout and paste and molten metal and molten glass and ceramic clay in its plastic state. It also includes slurry mixtures.

The scope of surfaces or bodies the materials to be spread onto would include: platen or shingle or board or flange or shelf or plate or platter or banana leaf or bisquit or slice of bread or tortilla or pancake or cake or potato chip or corn chip, or cracker, or cheesecloth or ceramic tile or glass surface or metal surface or composite leaf; all of which may further comprise solid or porous even or uneven surfaces. It is considered that the entire leaf or the partial leaf could be spread on by the invention.

In its simplest form a trowel having a top side and an underside of any flat shape has a hollow pipe handle on top that is in hollow communication through to the underside of the trowel. The handle can be filled with masa and delivered to the underside by pressing the masa through the hollow handle with the thumb or with a piston that is manually or with mechanical means pressed into the hollow handle to extrude the masa.

Figure 1A:
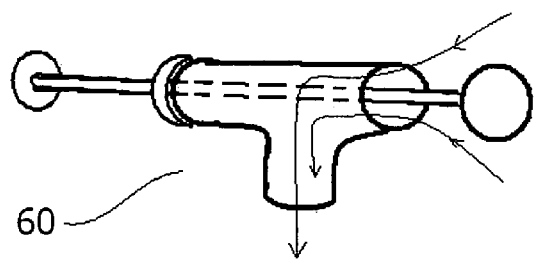
FIG. 1A is schematic oblique view of a plunger type self closing fluid control valve.
Figure 1B:
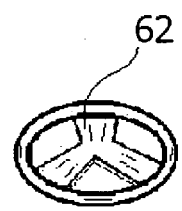
FIG. 1B is schematic oblique view of a rotary type fluid control valve.
Figure 1C:
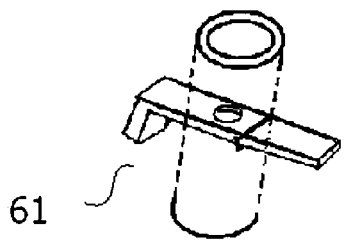
FIG. 1C is schematic oblique view of a slide type fluid control valve.
Figure 1D:
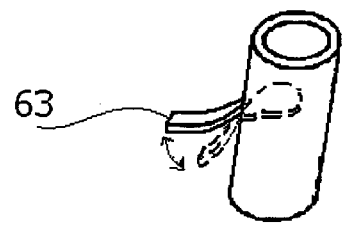
FIG. 1D is schematic oblique view of a butterfly type fluid control valve.
Figure 1E:
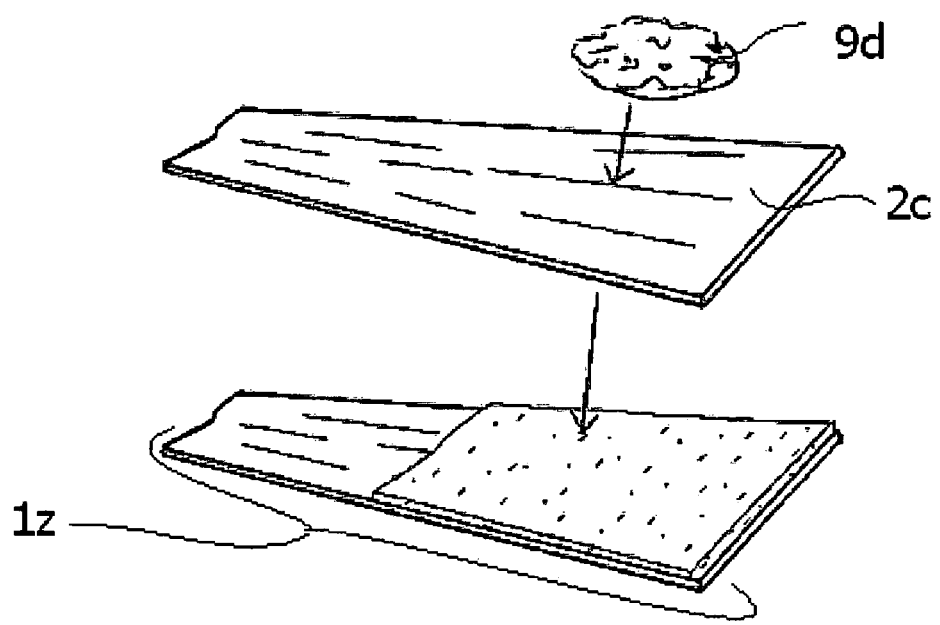
FIG. 1E is an oblique view of a corn husk becoming a tamale blank.
Figure 1F:
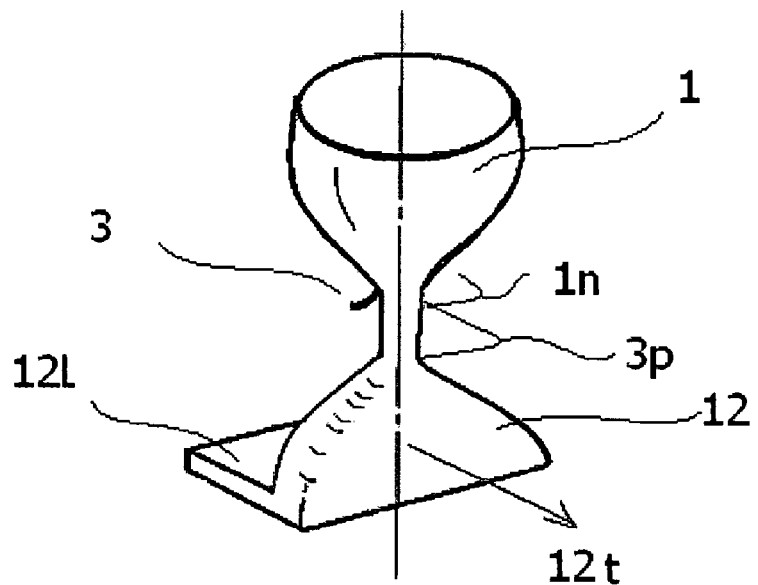
FIG. 1F is an oblique schematic view of a spreading system incorporating a masa chamber and a funnel foot.

Means for Making Tamale Blanks:

FIG. 1. Illustrates schematically: one exemplary embodiment of a tamale masa pressure spreading system. The system 10 as shown in FIG. 1 and schematically in FIG. 6 includes a masa container 1 as shown in FIG. 1 and FIG. 1F that is substantially cylindrical in shape and that has a removable substantially air tight top it. When the top is in place it defines a masa container chamber. The top has a means such as a nipple $1p$ for connecting an air hose $1h$ for supplying pneumatic pressure to the chamber. It should be considered that the nipple $1p$ as shown in FIG. 1 also schematically represents such mechanisms as an electric screw drive motor and screw shaft or rack and pinion drive. An air compressor 4 as shown in FIG. 1 having a motor and a reservoir tank or not and a regulator with gauges is shown to represent a source of regulated compressed air but it is to be understood that this part also schematically represents what could be a commercially available tank of nitrogen gas or CO2 gas or other suitable gas or supply of pressure regulated compressed air for pressurizing the chamber. A self-contained unit can alternatively also be represented by 4 as shown in FIG. 1 The air chamber is defined by the space between the masa 9 as shown in FIG. 1 and the masa container 1 as shown in FIG. 1 and the top it when the top is integrally attached to the container so as to result in a substantially air tight chamber.

It is considered that there are many ways or means to effect such integral attachment that it is obvious and not necessary to show by illustration; but for example, could be accomplished by the top and the container being threaded to cooperate with each other or the top may be hinged to the container, as in a vacuum cleaner and have a mechanical snap to tightly shut the top onto the container or the top may fit snugly over the top edge of the container and be screwed to it with screws as schematically suggested by $5t$, $5s$, $5h$ and $5d$. It is a considered aspect of this system that relatively low air pressure, that is less than about 120 psi, is used to pressurize the chamber to motivate the tamale masa through the system. The container has a conduit neck $1n$ that is in masa delivering communication between the container and the presser foot 2, all the way through to the underside of the presser foot. The neck acts as the handle by which the system is manipulated to deliver masa to the underside of the presser foot. A momentary electric switch trigger, or a pneumatic bulb actuator switch 3 is mounted near the top of the neck. It is used by the operator to increase the flow of compressed air into the chamber by actuating an electrical circuit. This can also be a mechanical butterfly valve actuator 63 as shown in FIG. 1D, a slide valve actuator 61 as shown in FIG. 1C or a rotary valve actuator 62 as shown in FIG. 1B. The circuit not shown connects from the trigger actuator 3 to a supply of electrical power to the electrically actuated valve $3v$ as shown in FIG. 1, that operates an electrically actuated normally closed pneumatic valve $3v$. By pulling the trigger, the valve is opened and compressed air flows into the chamber and forces the masa to flow while the trigger is held closed. Alternatively; the chamber is under constant pressure and the trigger could actuate open, a closed biased, masa flow valve means such as a butterfly valve or slide valve or rotary valve which are exemplarily shown in group oblique schematic at FIG. 1A but are hidden inside the neck to regulate the flow of masa to the underside of the presser foot.

The container could be suspended from ceiling hooks not shown or a kitchen ceiling pot rack type frame, also not shown; via at least 1 shock cord or rope or strap or tension spring all schematically represented at $6s$ and attached to the container via dependent eyelet lobes on the side of the container near the top of the chamber $6a$ and $6b$.

Use of the system thus involves filling the container and securing the top to it. A supply of compressed air is also in communication with the top. Further In FIG. 1, for example, a right handed person would place and hold, with her left hand, a corn husk $2c$ on a table or on a thick cutting board 8 that is on a table top or equivalent and then with her right hand physically grasp the neck of the container, placing her index finger on the trigger. She would then press the trigger to send compressed air into the chamber and cause masa to flow and present a dollop of masa 9d to the underside of the presser foot and release the trigger to stop the flow of masa and then press the foot down, as indicated by arrow 12t as shown in FIG. 1 and FIG. 1F, onto a corn husk roughly about midway of its length and laterally stroke, as indicated by arrow 12t, the foot linearly along the length or partial length of a corn husk being roughly centered thereon. Thus a tamale blank 1z as shown in FIG. 1 E is produced without having to reach and scoop for masa and without having to leave a batch of masa exposed to airborne contaminants. It can be set aside and the steps repeated to produce another and another etc. The parts, being: the conduit neck and the presser foot and the container can be made to be disassembled to be cleaned and stored. The nipple can be a pneumatic quick connector. The trigger actuator can be removable and comprise a pneumatic bulb actuator or an electric switch. The valve actuating circuit can be AC or DC or combined with a pneumatic actuator; however it is the inventors opinion that a 12 v DC pneumatic valve would be safest.

Figure 2:
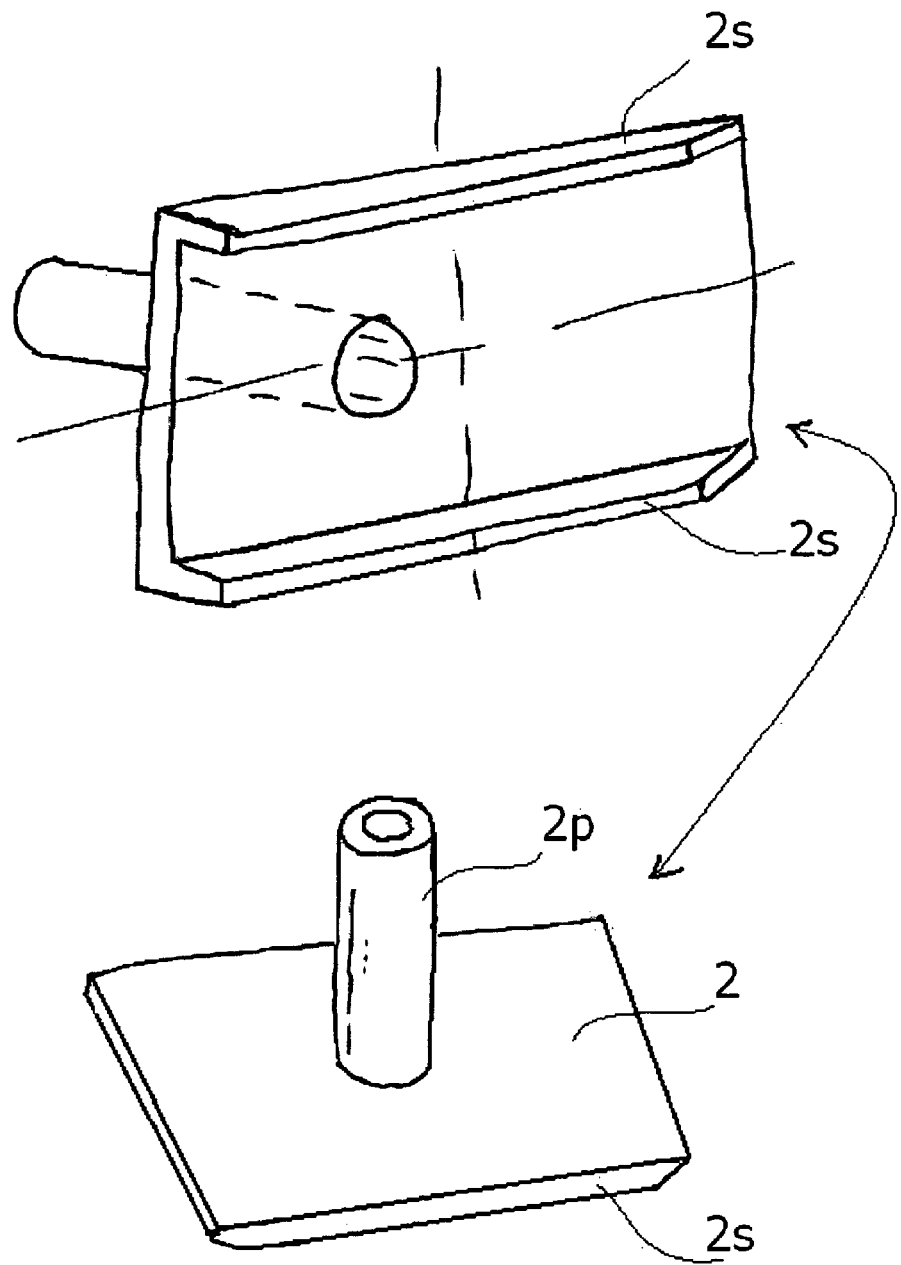
FIG. 2 is a top side and underside of a presser foot having skids; and a masa conduit
Figure 2A:
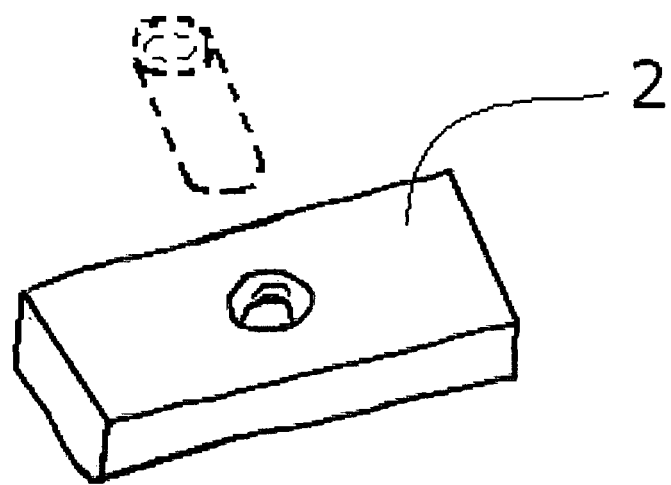
FIG. 2A is an oblique exploded view of a simple block presser foot with masa conduit.

FIG. 2. Shows a presser foot 2 comprising a trowel like substantially square flat base having front and back edges, defining its length and left and right sides respectively, defining its width. This base has a breadth comprising a length of from about 2 inches to about 6 inches and a width of from about 3 to about 12 inches. The front and back edges being two generally parallel edges. The generally flat base has a top side, a bottom side and with a transverse axis extending between said parallel edges and an imaginary longitudinal centerline; said flat base having at least one orifice disposed approximately midpoint between of each of said side parallel edges. It would be consistent with the present invention for there to be a plurality of orifices disposed between the side edges; and said orifice or orifices being in communication with a dependent pipe segment 2p extending upwardly above said topside and said pipe segment functioning as a masa conduit and a handle and a valve housing and valve actuating mounting base. The presser foot can have a pair of downwardly dependent skids 2s substantially running the length of the trowel along the side edges. The skids protrude from about $1/16^{th}$ in. to about ¼ in. and can be from about $1/16^{th}$ to about 5/16ths in. wide for purposes of tamale masa, but may be larger or smaller and be tapered on the ends in consideration of other uses.

Figure 1G:
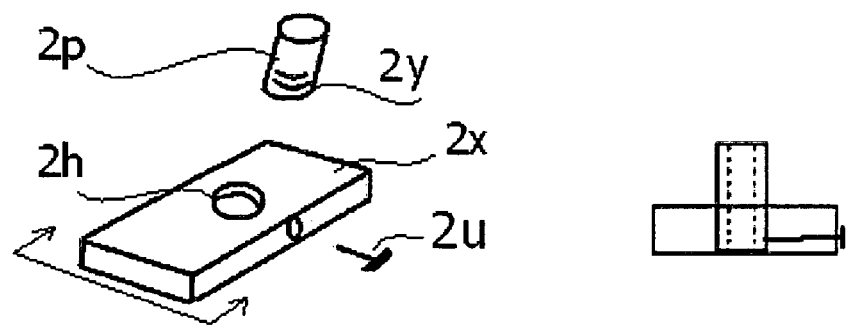
FIG. 1G is an oblique exploded view of a simple flat trowel type presser foot having a cross sectional view along side.
Figure 3:
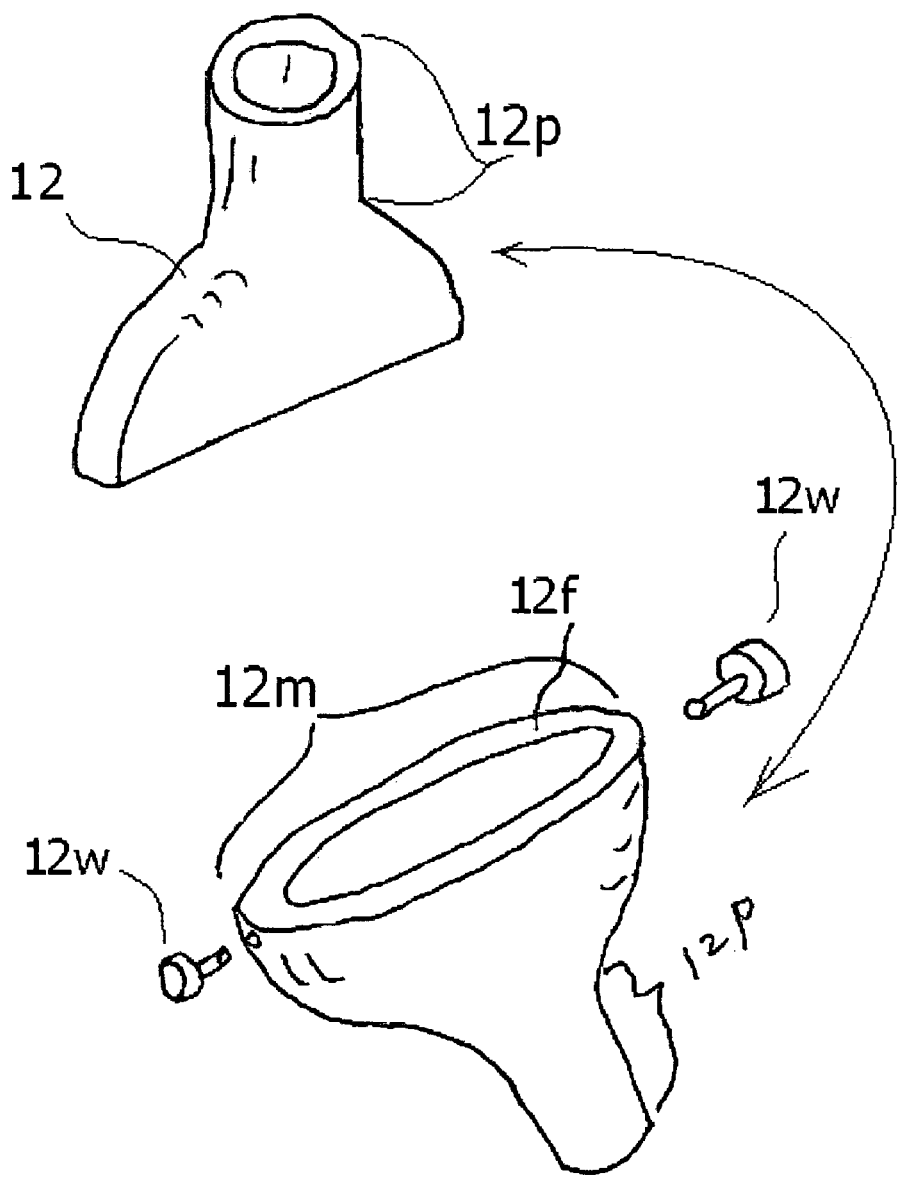
FIG. 3 shows two views of an obliquely presented Funnel foot with and without wheels.

When used to spread masa, the skids serve to help deposit a uniformly thick layer of masa onto the leaf. They also serve to limit the sideways flow of masa as the masa is pressed between the bottom of the foot and the leaf, thereby limiting waste and over spread of masa. They also help keep the presser foot moving straight in the linear direction of the skids. They are not required for the system to be made and to work however. With some practice a simple flat trowel having like communication with masa as indicated by FIG. 1G or 2x of FIG. 1G. or a plain funnel foot 12 as shown in FIG. 3 will also work. A plain trowel would comprise a rectangular block with a hole, 2h of FIG. 1G, in it. It would cooperate with a pipe nipple by being threaded 2y as shown in FIG. 1D. It could also be fixed to the block by being integrally made a part of it. It could also be a tightly fitting pipe segment held in place with a set screw 2u as shown in FIG. 1D.

Figure 4:
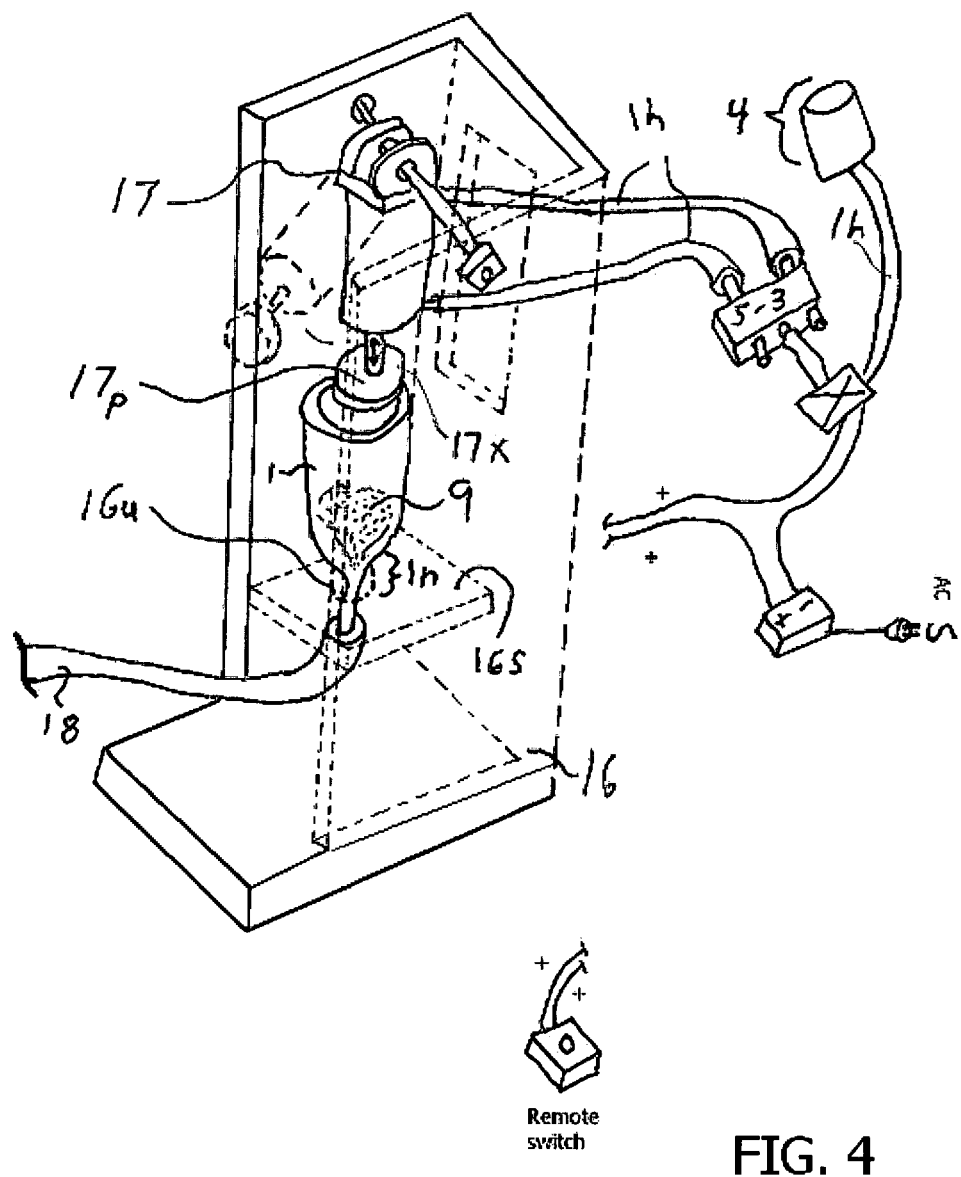
FIG. 4 is an oblique view of a cylindrical masa container that has a double acting pneumatic cylinder, masa motivating means.
Figure 4A:
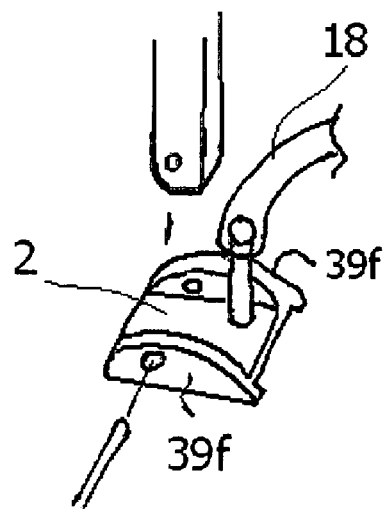
FIG. 4A shows obliquely; a swivel conduit connectable presser foot mountable to a presser arm.
Figure 4B:
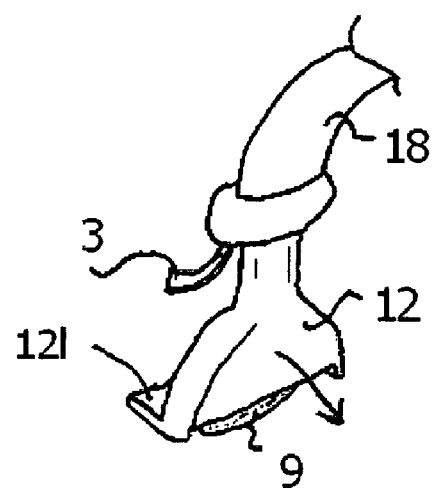
FIG. 4B shows a conduit connected hand held funnel foot with extended lip and flow switch.
Figure 4C:
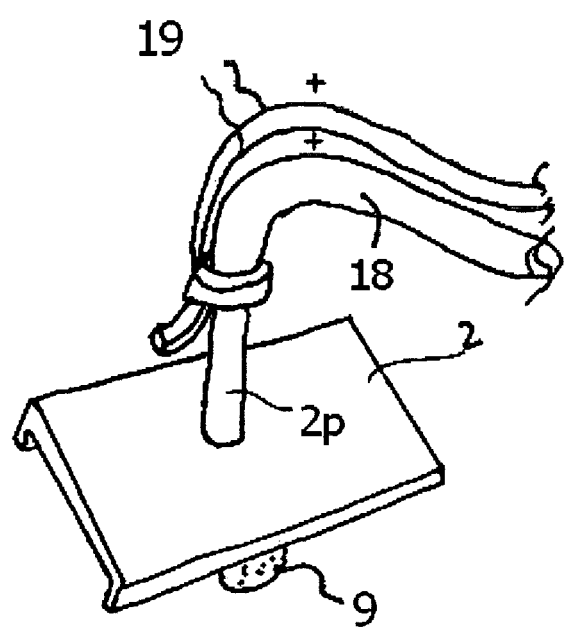
FIG. 4C is an oblique view of a flexible masa conduit connected hand held presser foot having an electric trigger switch and skids.

FIGS. 4A, 4B and 4C show three oblique views of alternate presser foots that may be used with this system. An oval mouth presser foot 12 as shown in FIG. 4B resembling an inverted funnel, when in use, herein sometimes referred to as a funnel foot as shown in FIG. 3, that has a hollow body with a transverse oval mouth 12m on one end and a dependent pipe segment 12p extending upwards comprising the opposite end in line with the longitudinal centerline of the body of the foot. Thus it comprises a conduit for masa. In one embodiment it is symmetrical from side to side. The funnel foot has an imaginary centerline through its symmetrical length. The oval mouth defines an opening that has a major and minor axis. The major axis can range from about 2 in. or 5 cm to about 6 inches or 15 cm in length and a minor axis that can range from about $1/16^{th}$ in. or 2 mm to about ⅜ in. or 11 mm. The funnel, foot has a wall thickness of from about $1/16^{th}$ in. to about ¼ in. It is intended that the funnel foot be used as a masa presser foot. It is further intended that this funnel foot oval mouth major axis is transverse in relation to the direction of stroke along the longitudinal length of a corn husk while the funnel foot is held so that its centerline is perpendicular to the leaf. The funnel foot oval mouth has a flat bottom face 12f. In an alternate design, the outermost edge has axle means such as a dependent formed axle or affixed axle bolt extending outward away from the body of the foot and parallel with the transverse axis, so that wheels 12w may be mounted thereto. The axles and wheels are fixed to the body of the foot so that the wheels protrude from about $1/16^{th}$ in. to about ¼ in. beyond the downward face 12f of the funnel foot and result in a minimum thickness limitation of masa deposited by use of this funnel foot while allowing the foot to roll rather than skid across the length of corn husks which can be sometimes delicate and tend to tear.

It should be considered to be within the scope of this invention that the leaf could be held flat on a plank and the plank and leaf linearly moved underneath a stationary funnel foot to obtain the same tamale blank results.

Figure 3A:
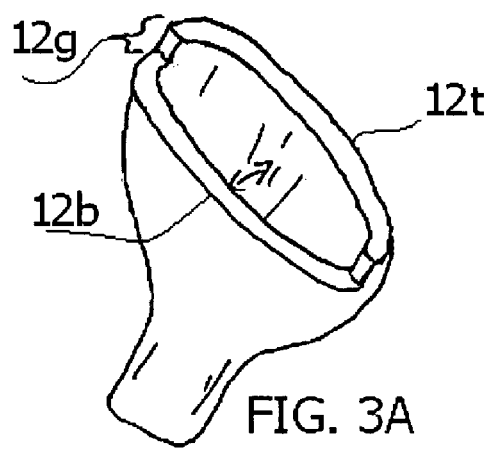
FIG. 3A is an oblique view of an oval mouth presser foot a.k.a. funnel foot.
Figure 3B:
FIG. 3B illustrates an embodiment of an oval mouth presser foot having an offset edge shown spreading masa.
Figure 3C:
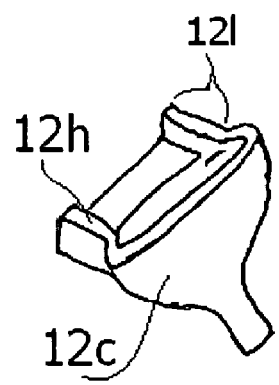
FIG. 3C illustrates obliquely, the underside of a funnel foot embodiment having an extended lip

In yet a second alternate funnel foot embodiment the oval mouth end has a dependent offset lip 121 as shown in FIG. 3A and FIG. 3C and FIGS. 1F and 12g as shown in FIG. 3, FIG. 3A, and FIG. 3B. This lip protrudes away from the body of the funnel foot and it is the same width as the funnel foot and may be flat or have dependent flanges on each end of the lip so as to provide a thickness limit skid of thickness 12h as shown in FIG. 3C. This embodiment has a mouth bottom and mouth top 12b and 12t respectively, as shown in FIG. 3A. The lip is dependent to the mouth top. In use, this funnel foot is held with the lip at an angle as shown in FIG. 3B so that the lip is above the extruding masa and presses down on the masa as the masa extrudes ribbon like from the mouth of the funnel foot and the funnel foot is simultaneously dragged, with downward pressure, across the leaf so that the lip trails behind the mouth of the presser foot pressing the ribbon of masa into the leaf.

In a remote presser foot embodiment of the system invented, the presser foot is connected via a flexible hose 18 as shown in FIG. 4, or pipes with swivel connections, to a housed masa container that has masa motivating means in cooperation with the masa container. A few main parts are first described as shown in FIG. 4: an elongate open box frame 16, which for descriptive purposes resembles a narrow bookshelf. This open box having a top end and a bottom end, is used to house a double acting pneumatic cylinder 17, hereafter DAPC. DAPCs like the one here considered are commonly commercially available. This one has a swivel yoke mounting means on one end, called the top end as it is illustrated. It is mounted via its mounting yoke to a bolt or shaft 17b that traverses the box frame near the top, and this DAPC has an extending and retracting piston shaft 17x that goes in and out of the opposite end to do linear work. The shaft has an internal end that remains housed within the DAPC cylinder and a distal end that is typically threaded for a relatively short length typically about 2 inches, for firmly and rigidly mounting tools and other things thereto. The one intended for the instant invention has mounted: a generally simple flat disk piston 17*p* made of metal or wood or plastic or a composite that is used to semi-air tight slideably fit into the concentrically aligned cylindrical masa container 1 as shown in FIG. 4 for pressing the masa out through the extruding hole on the downward end of the masa container cylinder 1. For purposes of description and to be consistent with the book shelf orientation and prior suggested description, the Masa containing cylinder has an open top end and it tapers to a neck on its lower end. This neck may be a removable pipe nipple or coupling attached to the masa containing cylinder or be such a nipple contiguously formed on the container. The piston may leak a little air so as to bleed out air pockets that may become trapped between the piston and the masa. In keeping with the relatively low pressure requirement and definition of this invention, this DAPC is of a nominal cylinder diameter size of at least from about 30% to about 50% of the inside diameter of the container containing the masa to be pressed by means of this DAPC and extruded through the system. Thus a 4 In. diameter container requires at least about a 2" diameter DAPC. Working temperature of the masa and length of the cylinder or square tubing container and the length of conduit trigger is closed. DAPC 17 from a source 4 through hoses 1*h* for extending or retracting the piston 17*p* into the cylinder pressing the masa 9 down to extrude it out of the cylinder and through the conduit 18. It should be noted that the effect of remotely controlling the DAPC is what is important and the specific valving may be accomplished by various means including a 5-4 foot operated pneumatic valve 17*f* as shown in FIG. 4, that has an advance, stop, and retract DAPC actuating control. By this system the presser foot can be either operated by humans and avoid the repetitive step of scooping or be used to easily attach the conduit connected presser foot to; automatic and/or robotic machines that can perform some or all of the masa spreading steps as described herein.

Figure 6:
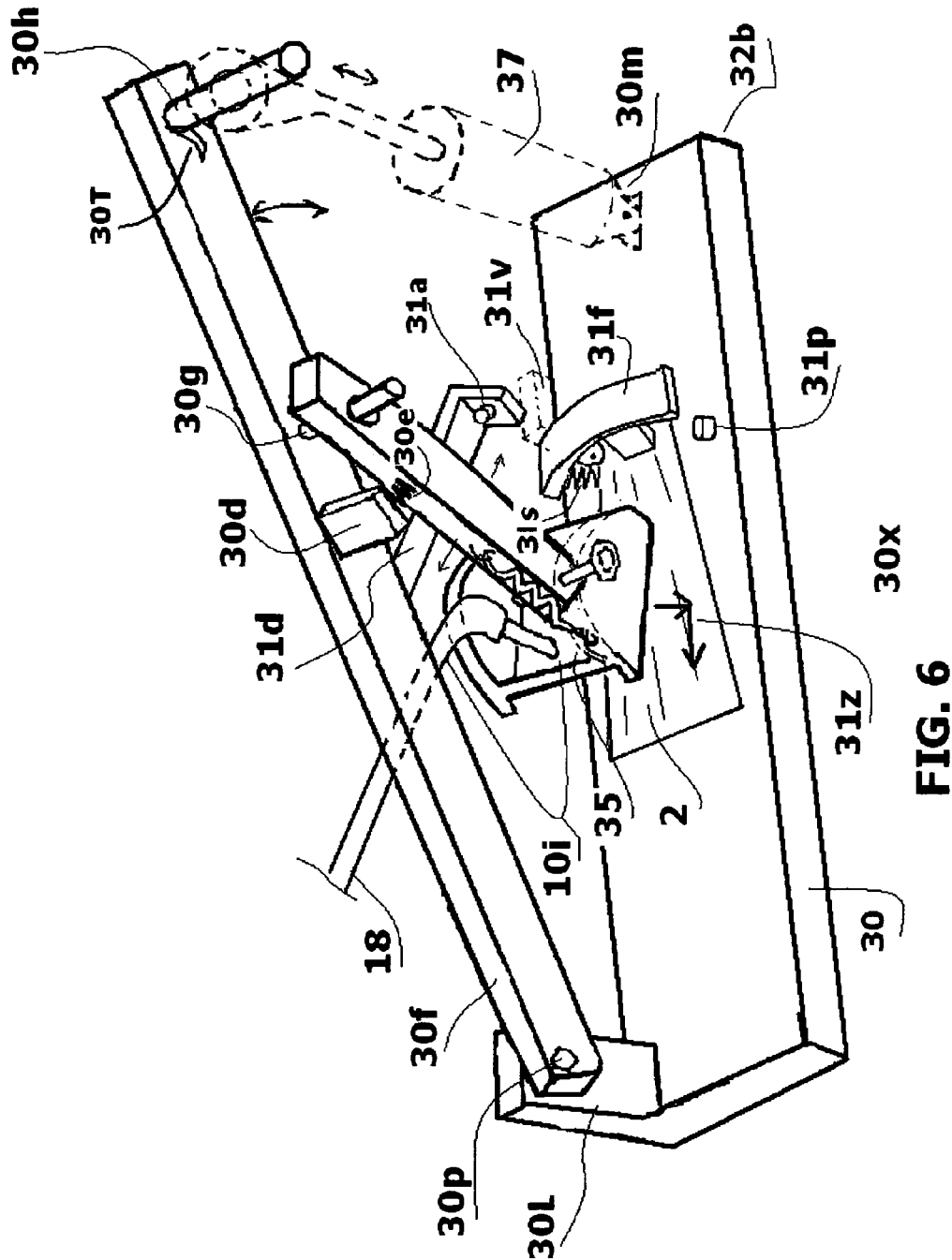
FIG. 6 shows a schematic oblique representation of a complex mechanism; called: two arm frame for spreading tamale masa.

A second complex embodiment is illustrated in FIG. 6 wherein the "Press and Stroke" arm 31 is shown in mid position: neither at rest nor at full stroke.

To facilitate description we shall consider that this is a frame that functions something like the way a traditional folding "A" frame wooden step ladder lying flat on its back might open and close as it lays on the floor if the cross bar of the"A" (the Press and Stroke arm) were hinged at the top leg and free to pivot and move up and down as the laying on its side "A" frame top leg might be raised and lowered. We shall further consider this embodiment to be made of oak hardwood or its stronger functional equivalents; thus being made of solid metal, metal tubing or composite materials. The dimensions provided go more towards general shape and strength than actually required dimension; however they would produce a workable system in the dimensions provided. To facilitate drawing and description this embodiment is configured to be an open frame where swivel shafts are connected to the frame on one end only; so to say that they depend therefrom. Obviously the frame could be made and described to be a closed frame that would still function to spread masa but would have a double, or parallel frame, so as to support the pivot shafts and swivel points on both ends and to provide extra control and strength. It is asserted that the embodiment as disclosed would "read on" and dominate such closed frame description or at minimum be the functional equivalent or anticipated obvious identical. The components of the system of FIG. 1 are schematically represented by 10*i* as shown in FIG. 6 to be mounted to "Press and Stroke" Arm 31 with the addition of a swivel presser foot. It :10*i*, also schematically represents the system of 80 as shown in FIG. 4 wherein the flexible hose 18 of FIG. 4 is affixed to the swivel presser foot 35 as shown in FIG. 6. This system comprises a rigid base such as a wooden plank 32*a* as shown in FIG. 6 or its functional equivalent. In this exemplary embodiment, the plank being from about 16 in. to about 36 in. in length and being from about 3 in. to about 12 in. in width and being from about ½ in. to about 1½ in. in thickness which has a front end 32 and back end 32*b* and *s* parallel side edges being relative to a person standing before the frame so that the front end is to the left of the person and the back end to the right, a near side 30 and a far side 30*b*. A dependent vertically extending column 301 is disposed at the front end far side or between the far side and an imaginary longitudinal center line that runs along the center top of the plank. It is the functional equivalent of a wooden 1×2 that is from about 4 in to about 12 inches long. A torque resisting main swing arm 30*f* that is the functional equivalent of an oak hardwood 2×4 that is about the same length as the base plank. One end of this main swing arm is pivotally connected via a transverse bolt 30*p* or its functional equivalent between the center and near the top of the vertical column 301 as shown in FIG. 6. This main swing arm 30*f* as shown in FIG. 6 has a first pivot presser arm control shaft 30*g* located near but between its midway length point and its distal end oriented transverse of the longitudinal centerline extending towards the near side. A second pivot shaft handle 30*h* oriented parallel to the first pivot shaft is affixed near the distal end of the main swing arm 30*f*. In manual operation this second pivot axle is the swing arm handle that would be grasped by the hand. Pivotally cooperating with the between the container bottom and the presser foot will have to be considered to determine the minimum size. This DAPC 17 is rigidly mounted, so that its shaft is concentrically aligned with the masa container, above the masa container, with its exposed piston downwardly plunge-able and retractable into and out of the open end of a masa container cylinder 1 in in-line cooperative alignment, with that container 1 as the container sits saddled loosely in a saddle hole 16*u* centrally located in shelf 16*s* via its neck 1*n* in rigid suspension from about 2 in. to about 12 in. above the base 16*b* of the frame. The shelf is rigidly affixed to the box frame roughly midway between the center and the bottom of the frame. The saddle hole is big enough to accept the neck but is significantly smaller than the outer diameter of the cylinder. This DAPC 17 with its piston shaft retracted can be swiveled 17*v* to the open front or back through a back window 17*w* for purposes of being moved out of the way to allow a relatively easy recharging of the container with masa. Note: for purposes of this description, it is understood that in practice this frame housing may be used in any orientation in space including but not limited to horizontal and upside down. This frame may be made of wood, plastic, or metal or metal tubing or a composite material or a combination thereof or wherein table tops and walls, floors and other means are used to create the functional equivalents of the enablements described here and should be considered within the scope of this description and the claims. In fact a large "C" Clamp frame with a large toothpaste like container of masa between its anvils would be a functional equivalent. In yet other words; the masa container is longitudinally rigidly harnessed to means for ramming a piston into the masa container for motivating the masa out of the container via an outlet on the container opposite the open end through which the piston is rammed.

Figure 6A:
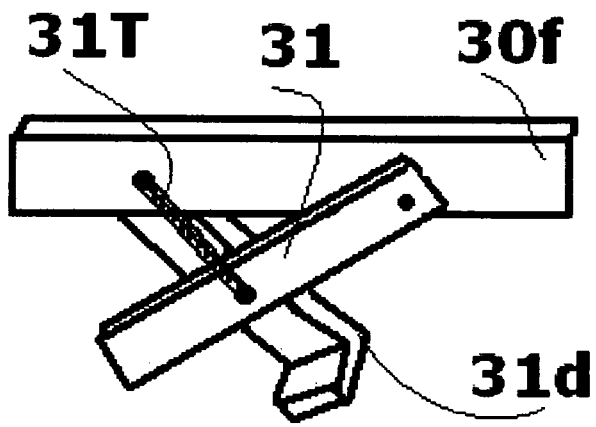
FIG. 6A Shows a press Arm pivot limiting means for the two arm frame mechanism.
Figure 6B:
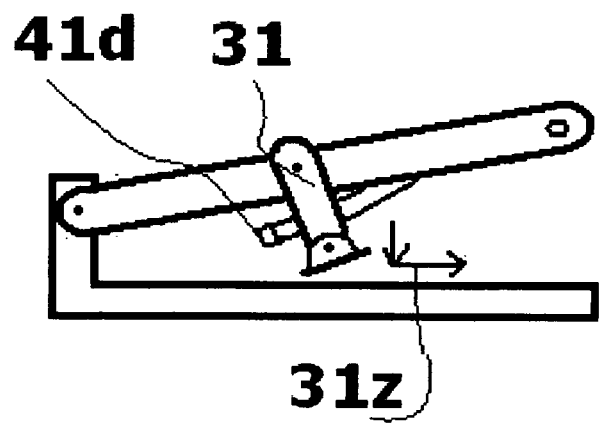
FIG. 6B Shows, exemplarily, an opposite directional swing arm movement embodiment of the two arm frame mechanism.

The masa container is held down in the shelf saddle hole by means of an anchor screw 16t that affixes the container to the frame so that when the piston is retracted, to allow for disassembly for cleaning or for recharging the container with masa, the container will remain seated to the shelf and not float up with the piston as it is retracted. A conduit hose or pipe with swivel joints 18 connects a presser foot of trowel style or nozzle style 2 or swivel presser foot 12. The presser foot has a momentary electrical normally open trigger control switch 3 for actuating an electrically actuated normally closed pneumatic valve 19e via wires 19 and electric power source 19p to allow compressed air to flow into the 5-3 valve 19v. Then, depending on how the control arm 19x is thrown: The control arm thrown in one first position 19o will cause the DAPC shaft to extend or go out of the DAPC cylinder and in the second position 19i will cause the shaft to be retracted or go into the DAPC cylinder pulling the piston mounted thereon out of the masa container when the first Pivot presser arm Axle is a "Press and Stroke" arm 31 as shown in FIG. 6 and partially in FIG. 4A and in FIG. 6D hereafter sometimes P&A arm. The P&A arm has a top end and a lower end and a midway point between the top end and lower end. The P&A arm pivots on the shaft in parallel with the longitudinal direction of the main plank center line. The P&A arm has a hole through it near its top end and is in pivot communication with the first Pivot shaft 30g. This P&A arm when at rest, that is, when the main swing arm is in its full up position, is held just about 5 degrees off of verticle by a pivot limiting means like an "L" shaped rest block 31d as shown in inset FIG. 6A or swing limiting cord 31t as shown in inset FIG. 6A, depending from, or mounted to the main swing arm. The swing arm "L" block is oriented so the long leg of the "L" is depending from the swing arm between the pivot PSA shaft and the pivot end of the swing arm and having the short leg of the "L" oriented transversely towards the near side so as to contact the back side of the PSA for holding the PSA from about 5 degrees to about 15 degrees off vertical so that when the swing arm is lifted and held so that the presser foot underside is from about 1 in. to about 5 in. above the plank the PSA bottom end is slightly forward of its top end because the "L" block is holding the PSA from swinging perfectly vertical but is instead in a bias slant orientation such that when the swing arm is lowered in a limited stroke, it contacts, a lubricant such as masa on the plank or leaf on the plank, at an angle, resulting in a sliding of the presser foot 35 as shown in FIG. 6 linearly towards the end it is biased to, as indicated by the arrows indicative of movement 31z as shown in FIGS. 6 and 6B. In the case of a block depending from the plank 31u as shown in FIG. 6, the rest block can be mounted to that plank dependent block. The PSA's lower end has a limited pivot presser foot pivotally mounted to it also in transverse axle pivot orientation.

Shown in enlarged view FIG. 6C and FIG. 6D The limited presser foot comprises a generally rectangular flat base, having a top side and a bottom side and having front and back edges and parallel sides. It has mounting flanges 39f as shown in FIGS. 6C and 6D extending upwardly depending along the area along the top sides. They have mounting holes that cooperate with a wrist pin shaft 39 as shown in FIG. 6D, that traverses and cooperates with a hole the lower end of the P&A arm 39o as shown in FIG. 6D. A hold open spring 39g as shown in FIG. 6D, may be mounted to the front edge of the flange and to an area on the P&A arm between the lower end and the mid-point of the length of the P&A arm.

The limited pivot presser foot otherwise comprises a complete system 10 as shown in FIG. 1 wherein the foot is the pivotally mounted foot 39f as shown in FIG. 6C and FIG. 6D to the Press and Stroke arm lower end. Alternatively the presser foot may comprise In an automatic system embodiment a DAPC 37 having a pivot cooperating eyelet on its piston shaft distal end 30y is also pivotally mounted so as to pivot in the direction of the longitudinal center line is hinge mounted 30m at its bottom end near the back end of the main base plank. This DAPC 37 functions to raise and lower the main Swing arm 30f. by lifting and lowering the second pivot axle 30h via a cyclic controller that performs a full stroke that is a: "Contract and Expand" cycle, of the DAPC 37. In cooperation with the cyclic actions of the DAPC 37 other actuators: one sensor 31p that senses when a leaf is being held by a spring loaded finger ready to be spread 31p and a second sensor 31q that senses when the "Press and Stroke" arm is at its full rest stop 31q that triggers the automatic delivery of a limited masa dollop to the presser foot's 35 underside that is pivotally attached to the lower end of the "Press and Stroke" arm 31.

The "Press and Stroke" Arm is

In a combination embodiment only the masa delivery is controlled by manually operating an actuator such as an electric momentary trigger switch 30t mounted adjacent to the pivot axle handle 30h which is now the swing arm handle both of which are operated by hand.

When at rest the main swing arm 30f is fully up the Press and Stroke arm is held at rest at a slight angle of about 5 degrees off vertical slanted towards the front so that the lower end is slightly towards the front end of the plank and the top end is slightly towards the back end. When the main swing arm is pulled the stroke is towards the front of the plank.

Alternatively this orientation of the Press and Stroke arm is reversed as shown schematically at inset 6B of FIG. 5. So that when the main swing arm is pulled down the stroke is to the back end of the plank.

A spring biasing means such as a coil spring 30s that is compressed and in cooperating contact between two lugs; a first lug 30d that is mounted near the center point of the main swing arm and a second lug 30e mounted between the center and the top of the Press and Stroke arm that nearly concentrically aligns with the first lug; so that the spring pushes the lugs apart and thereby biases the Press and Stroke arm to resist compression and supply significant downward force throughout the cycle of the stroke. This serves to firmly press the masa into the leaf. Due to the fact that tamale masa can act as a lubricant when the presser foot contacts the leaf, the presser foot because of the spring bias will first compress the masa and extend it flatly under the presser foot. As downward pressure is applied to the Main Swing arm handle the Press and Stroke arm slides towards the back end as it swivels on the presser arm control shaft and masa is spread and adhered to the leaf producing a tamale blank.

FIGS. 5, 5A and 5B shows an oblique schematic of a masa spreading system that, summarily comprises, a plank with a vertical support column and a DAPC mounted to the vertical column having a pivot presser foot mounted to the shaft of the DAPC and connected to masa delivery means. It uses the masa delivery system and combines the action of the swing arm and the press and stroke arm of the FIGS. 4 and 6 indicated embodiments.

Figure 5C:
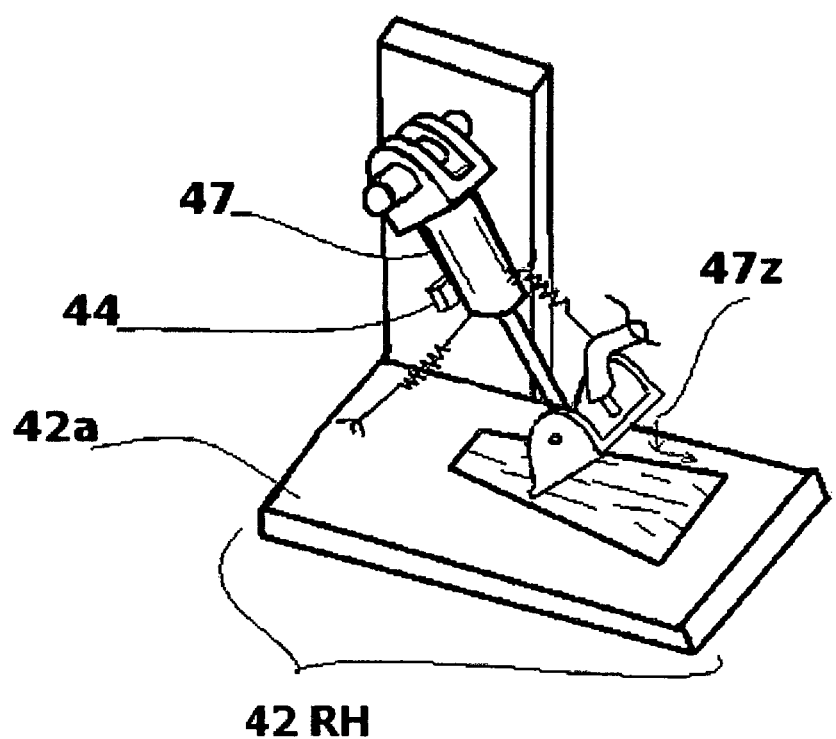
FIG. 5C shows a right hand oriented oblique schematic view of a tamale spreading system; called single slide arm frame.

More completely FIGS. 5 and 5A comprises: a plank with left or front end; and, a right or back end, a near side and far side. It also has a DAPC vertical support column 46 as shown in FIG. 5: That for this exemplary embodiment will be called a 2×10, that is 24 inches tall mounted to the back end far side so that the 10 in. planar surface faces the plank longitudinal centerline and is parallel with it. The DAPC is pivotally mounted near the top of the vertical column via a pivot mounting end 47*p* as shown in FIG. 5, so as to allow pivot in the direction of the centerline and the DAPC extends from the back end towards the front end. The DAPC support column has a rest block 44 which holds the DAPC at an angle of from about 3 to about 20 degrees off vertical. A presser foot 2 as shown in FIGS. 5, 5A and 5B, is pivotally mounted to the head of the DAPC piston. The cyclic controls of the masa delivery to the presser foot comprise a masa container having masa motivating means. The DAPC has a supply of compressed air that is remotely control as indicated by the symbolic presser foot and hose 10*i* as shown in FIG. 5. to expand and/or contract the DAPC causing the presser foot to press and slide along the plank and to retract. The FIG. 4 or the FIG. 5 systems are employed to control the masa delivery and the DAPC to effect the spreading of masa on a leaf. A spring connected to the lower end of the DAPC cylinder 42*s* as shown in FIG. 5 and to the area of the plank behind the rest block provides downward thrust bias to the presser foot as the piston is extended to produce a masa spreading stroke as indicated by the arrows indicating motion 47*z* as shown in FIG. 5C. The embodiment can be made so that the plank is to either side or is re-configurable so that left or right handed operators can reconfigure to their advantage as indicated by the opposite indicated schematics 42*lh* and 42*rh* as shown in FIG. 5.

I claim:

1. A tamale masa spreading tool for the efficient, sanitary production of tamale blanks; comprising; a generally flat planar rectangular trowel presser foot having a top side and a bottom side; said presser foot having at least one hole through it and said hole is constructed and arranged for accepting and firmly attaching to a sanitary tubular conduit so that tamale masa can be sanitarily rigidly disposed within the tube, unexposed to atmosphere wherein said tube further including a piston; actuated by finger pressure or mechanical pressure applied to said piston thereby dispensing said masa through the conduit and presser foot to the bottom side through said hole of said presser foot for smearing and adhering said masa onto a leaf.

2. The tamale masa spreading tool of claim 1, wherein said presser foot has a pair of parallel edges and skids protruding from said edges about 1/16 inch to about 1/4 inch and being from about 1/16 inch wide to about 5/16 inch wide, said skids running along the edges on the underside of said presser foot for substantially the length of the presser foot.

3. The tamale spreading tool of claim 1, wherein said presser foot includes first and second parallel opposite sides and edges and skids protruding from said edges about 1/16 inch to about 1/4 inch and being from about 1/16 inch to about 5/16 inch wide, said skids running along the edges on the underside of said presser foot, for substantially the length of the presser foot; said masa presser foot further including a nipple portion communicatively connected to a flexible conduit which is in further communication with a masa container and wherein said presser foot is constructed and arranged to include means for pivotally mounting said presser foot to a mechanical presser arm or having a neck which is usable as a handle.

4. The tamale spreading tool of claim 1, wherein said presser foot includes a pair of parallel edges and skids protruding from about 1/16 inch to about 1/4 inch and being from about 1/16 to about 5/16 inches wide, said skids running along the edges for the length of the pressure foot; said pressure foot including a tubular conduit which includes a first end and a second neck end wherein said second neck end is in communication with a sanitary, cleanable refillable masa container comprising a removable substantially air tight top, said container in operative communication with a supply of compressed air wherein the compressed air causes the masa contained within the container to be dispensed through the presser foot and wherein the flow of masa is controlled by means of a finger trigger switch mounted near said second neck end, foot operated switch; finger operated valve or digital programmable actuating controller and combinations thereof.

5. The tamale spreading tool of claim 1 wherein the said presser foot tubular conduit further includes a first trowel end and a second neck end wherein said second neck end communicates with a sanitary, pressurizable refillable masa container including a removal top wherein the presser foot includes include means for a controlled dispensing of masa from said spreading tool.

6. A sanitary masa spreading system comprising a masa motivating tubular container in communication with a presser foot; wherein said container is sealable, cleanable, constructed of food handling material, refillable, masa container wherein said container include masa motivating means which is selected from the group consisting of tube squeezing means, motorized piston advancing means, ratchet and pawl piston advancing means, lever operated piston advancing means and screw drive piston advancing means; and wherein either said piston advancing or tube squeezing means is regulated and controlled via means selected from the group consisting of one or more manual or automatic actuation, foot actuation, digital actuation and a combination thereof; and wherein said communicated presser foot means is selected from the group consisting of a flat trowel, a flat trowel having skids, an oval mouth funnel foot, an oval mouth funnel foot having a dependent offset lip and an oval mouth funnel foot having a depended offset lip, said lip further including protruding skids.

7. A cleanable masa conduit funnel presser foot comprising a nipple portion and a flat funnel shaped oval mouth portion wherein the two portions are continuous in a single piece construction, said presser foot includes a nipple section and oval mouth portion having a wide dimension of from about 2 Inches to about 6 inches and a narrow dimension from about 1/16 inch to about 3/8 inch and wherein said wide dimension include extreme ends; and wherein said presser foot is constructed and arranged of a textile compatible for receiving tamale masa inflow communication through its nipple portion that is delivered under pressure and capable of dispensing said masa exiting the mouth portion to a leaf.

8. A cleanable masa conduit funnel presser foot of claim 7, wherein said mouth has a trowel lip portion extending from about 1/16 inch to about 6 inches beyond said mouth and extends the width of said mouth.

9. A masa conduit funnel foot of claim 7, wherein said mouth includes a trowel lip portion which extends in length from about 1/16 inch to about 6 inches beyond said mouth and wherein said lip further includes a first and second edge along said wide dimension extreme ends and where said nipple portion is a continuous single piece construction with a cleanable masa container.

10. The conduit funnel presser foot of claim 7, in operative connection with a tubular masa motivating container; said presser foot comprising an elongated hollow nozzle body having an outlet face and wherein said nipple section is fluidly connected to a pressure supply which is fluidly connecting to the masa motivating container to apply masa to a leaf wherein said outlet face includes inner leading edge and an outer trailing peripheral edge and wherein the trailing edge extends further than the leading edge.

11. A tamale masa prismatic smearing system comprising a frame, which comprises a plank wherein said plank has width and length which length extends from its first end to its second end and a top side and an underside and a first edge and a second edge wherein said plank has a dependent vertically extending support column having a top end and a bottom plank end proximate to its second edge and second end and having mounted near said vertical column top end an expanding and contracting double acting elongate cylinder (DAC), having a top pivot mounting end and lower working shaft end; wherein said DAC is pivotally mounted by its top mounting end near said vertical support column top end to allow said DAC to pivot parallel, with the length of the plank, and which DAC elongate body is supported by a vertical support column block rest means so that the DAC elongate cylinder body can rest thereon and is held resting at an angle from about 5 degrees to about 15 degrees from vertical and extends towards the plank first end; a presser foot comprising a generally flat planer rectangular trowel, said trowel is a presser foot, said presser foot has a top side and a bottom side, and said pressure foot has at least one hole through it and said hole is constructed and arranged for accepting and firmly attaching to a sanitary tubular conduit so that tamale masa can be sanitarily transmitted there through, and is constructed and arranged to be pivotally mounted to said working shaft end; wherein said DAC includes means for regulation and remote control said system further comprising a sanitary, cleanable, sealable, refillable, masa delivery means through said tubular conduit to said presser foot underside; wherein a leaf is disposed on said plank under said presser foot such that when actuated said presser foot is advanced by said piston towards said plank and said plank and leaf result in a prismatic joint used for smearing masa onto said leaf by delivering masa through the presser foot as the presser foot approaches and slides over a leaf disposed on the plank to produce a tamale blank.

12. The tamale prismatic system of claim 11 wherein said double acting cylinder (DAC) is selected from the group consisting of a motorized piston advancing means, ratchet and pawl piston advancing means, lever operated piston advancing means and screw drive piston advancing means; wherein said piston advancing means is regulated and controlled by manual or automatic means selected from the group consisting of manual actuation, automatic actuation foot actuation digital actuation and a combination thereof.

13. A sanitary tamale masa spreader for effecting limited adherence of masa to a leaf comprising a presser foot; said presser foot comprising a flat planer rectangular trowel, said presser foot having a top side, bottom side, and said presser foot having at least one hole through it and said hole being constructed and arranged for accepting and firmly attaching to a sanitary tubular conduit for holding tamale masa sanitarily therein; or a cleanable masa conduit funnel presser foot comprising a nipple portion and a flat funnel shaped oval mouth portion wherein said funnel presser foot oval mouth portion has a wide mouth dimension of from about 2 inches to about 6 inches and a narrow mouth dimension of from about 1/16 inch to about 3/8 inch, wherein further said funnel presser foot is compatible of receiving tamale masa inflow through its nipple that is delivered under pressure and then capable of transferring masa, exiting its mouth, to a leaf, and is in masa communication with a sealable cleanable, constructed of food handling material tamale masa container, wherein said container is selected from a toothpaste type tube, or tube, has masa motivating means is selected from the group consisting of squeezing means, motorized piston advancing means, ratchet and pawl piston advancing means, lever operated piston advancing means and screw drive piston advancing means wherein said motivating means is regulated and controlled by automatic or manual actuation means selected from the group consisting of manual actuation, automatic actuation foot actuation, digital actuation and a combination thereof.

14. A sanitary tamale masa delivery system comprising a scalable cleanable and refillable rigid tubular container in communication with a masa transmitting conduit, said tubular container being harnessed in a frame having masa motivating means; said motivating means further comprising a double acting cylinder (DAC); said DAC having a mounting end, a shaft working end and a masa pushing piston mounted to its shaft working end constructed and arranged so that said DAC is harnessed within said frame in cooperation with said tube container of masa such that the piston can be moved into and out of said tube container, so that masa in said tubular container via pressure from the masa pushing piston, can be motivated out of said tubular container dollop by dollop said system further comprising a tamale masa presser foot means, and wherein said presser foot has an underside, said presser foot means is in fluid communication with said masa tubular container including a remote actuation of said DAC; said tubular container is capable of being refilled with masa by retraction of said masa pushing piston out of said tubular container thus providing access to refill said tubular container; and which said masa tubular container is in communication with said presser foot underside by at least one orifice in said presser foot.

15. The sanitary tamale masa delivery system of claim 14 wherein said masa tubular container masa motivating double acting cylinder means is a double acting piston driving means (DAP) and is constructed and arranged to be actuated by any one of compressed air, hydraulic pressure or by a motor, wherein said double acting cylinder means comprises a piston shaft that extends or expands and contracts in response to compressed air, hydraulic pressure, or electricity; and further including conduit means for supplying said compressed air or hydraulic pressure from a compressed air or hydraulic pressure source or electricity source; and, a remote actuating valve for controlling said DAP; wherein said DAP piston is constructed and arranged to slideably enter into and exit from said masa container; wherein said container is tubular and has an open end and an opposite end that tapers to a neck; wherein said piston shaft has sufficient travel length to effect the substantial complete exhaustion of said masa from said masa tubular container via expansion actuation of said DAP and also completely extract said piston from said masa tubular container via its contraction actuation to allow said refillable chamber to be refilled with masa; and, a frame harnessing means for harnessing said DAP in rigid longitudinal relation to said masa tubular container means; said frame having a top end and a bottom end, selected from the group consisting of: a cage frame, an elongate box housing frame having a DAP pivot mounting bolt near its top; a support shelf for supporting said masa tubular container neck, near said frame bottom end and said masa tubular container resting on said shelf so that said DAP is in cooperative alignment with said masa container and so that when filled with masa, said masa piston can enter said masa container and effect masa extrusion through a conduit that is in communication with said masa presser foot means.

16. A sanitary tamale masa spreading system comprising a frame said frame further comprising a plank wherein said plank has width and length which length extends from its first end to its second end and a top side and an underside and a near edge and a far edge; wherein further said plank has a dependent vertically extending support column proximate to its far edge second end, said column having an upper end and having pivotally mounted near said upper end a double acting cylinder (DAP) of a desired length; said DAP having a top pivot mounting end and lower working shaft end which DAP is pivotally mounted by its top mounting end to allow said cylinder to pivot parallel, with the length of the plank, and which vertically extending support column has a resting block for momentarily holding said DAP at an angle from about 5 degrees to about 15 degrees from vertical and said DAP extends towards the first end; and wherein further, a presser foot comprising; a substantially flat planer rectangular trowel, said trowel presser foot, has a top side and a bottom side, and, said presser foot has at least one hole through it and said hole is constructed and arranged for accepting and firmly attaching to a sanitary tubular conduit is pivotally mounted to said working shaft end; wherein said DAP has expansion and contraction actuating means that is constructed and arranged to be regulated and remotely controlled by manual actuation or digital actuation or a combination of manual and automatic actuation and wherein further said system further comprises a sanitary, cleanable, refillable controlled masa delivery means for sanitarily transmitting masa to said presser foot's underside; wherein when actuated said presser foot and said plank result in a prismatic joint, wherein further a corn husk leaf is held substantially under said presser foot wherein said presser foot is used to spread masa on a said leaf disposed on said plank and when said presser foot approaches said plank, masa is delivered to said presser foot underside as it prismatically slides over said leaf.

17. A sanitary, prismatic joint, tamale masa spreading system comprising a presser foot and a frame and a tubular masa container wherein said pressure foot further comprising; a flat planer rectangular trowel, said trowel Is a presser foot, that has a top side and a bottom side, and, said presser foot has at least one hole through it and said hole is constructed and arranged for accepting and firmly attaching to a sanitary tubular conduit so that tamale masa can be sanitarily transmitted there through; wherein further, said presser foot is constructed and arranged to have means for pivotally mounting said presser foot to a mechanical presser arm; and, wherein said frame further comprises a rectangular horizontally disposed base plank; said plank having a first end and a second end corresponding relative to the longitudinal ends of said plank; said plank further including a first near side and a parallel opposite second far side, corresponding to a first edge of the plank that extends from end to end; said first near side and the edge opposite being the second side or the far side; and said plank has near its first end far side a first revolute joint to which is dependent an elongate main swing arm that has a first pivot end, a midpoint, and, a second or distal end; and, said main swing arm can swing in an up and down arc; wherein said arc is parallel to a plane that is vertically extending from said plank, as said swing arm pivots on said revolute joint; and said swing arm has revolutely depending from a point near its mid-point a revolutely dependent, spring biased, torque resisting, pressure applying arm (PSA); and said main swing arm has a pivot shaft/handle oriented transversely to the length of the swing arm, parallel to the revolute pivot point, depending from near said distal end of said main swing arm; and said PSA having a top end a lower end and a midway point and some length and it has a transverse hole through it near its top end, said PSA is constructed and arranged to be pivotally and spring biased and torque resistingly mounted to said main swing arm midpoint; said PSA having a first edge and a second edge which second edge is disposed towards said plank second end; and, a presser foot mounting means near the lower end, said presser foot is pivotally mounted to the PSA lower end and is able to swivel, in a limited arc; and, said presser foot can swivel downward to being about parallel with the PSA length but it can only swing upward to be perpendicular the PSA length; said presser foot is in masa conduit communication with said tubular masa container further comprising a sanitary controlled masa delivery means; and, said presser foot further having means for biasing the presser foot to be closely held perpendicular to the PSA length so that it can only swivel parallel to the revolute joint of said PSA wherein further said PSA is constructed and arranged with resting block means for holding the PSA from about 5 degrees to about 15 degrees off vertical wherein further when the swing arm is swung towards the plank, the presser foot is first pressed downward and as the swing arm is continually swung downward the PSA pivots upward against spring biased torque resistance and holds said presser foot flat and down while sliding along said plank; forming a prismatic joint as the swing arm swings through the arc.

18. The sanitary tamale masa spreading system of claim 17 further comprising a masa container wherein said container is a sealable, cleanable, constructed of food handling material, refillable, masa container wherein further said container has masa motivating means and is in masa conduit communication with said presser foot; wherein said masa motivating means is selected from the group consisting of tube squeezing means, motorized piston advancing means, ratchet and pawl piston advancing means, lever operated piston advancing means and screw drive piston advancing means; wherein said masa motivating means is regulated and controlled by manual or automatic actuation means selected from the group consisting of, manual actuation, automatic actuation foot actuation, digital actuation and a combination thereof; wherein said communicated presser foot means is selected from the group consisting of a flat trowel having at least one hole in it, a flat trowel having skids and at least one hole in it, an oval mouth funnel foot, an oval mouth funnel foot having a dependent offset lip and an oval mouth funnel foot having a dependent offset lip, where said lip further including protruding skids.

19. The sanitary tamale masa spreading system of claim 17 wherein further a double acting piston having a mounting end and a working end is pivotally mounted to said swing arm distal end shaft/handle by its working end and to said plank second end via said mounting end; and is manually or automatically actuated to lift and lower said main swing arm to effect prismatic masa spreading.

20. The sanitary tamale masa spreading system of claim 6 wherein further said masa tubular container is a self-contained unit for dispensing tamale masa, said unit operates in an auto cycle mode or In a timed mode including a dispensing time and a wait and pause mode between dispensations of tamale masa.

* * * * *